US006980736B1

(12) United States Patent
Fee et al.

(10) Patent No.: US 6,980,736 B1
(45) Date of Patent: Dec. 27, 2005

(54) VERIFICATION OF PATH INTEGRITY IN OPTICAL SWITCH NETWORK

(75) Inventors: John A. Fee, Garland, TX (US); Frank A. McKiel, Jr., Colorado Springs, CO (US)

(73) Assignee: MCI, Inc., Ashburn, VA (US)

( * ) Notice: Subject to any disclaimer, the term of this patent is extended or adjusted under 35 U.S.C. 154(b) by 170 days.

(21) Appl. No.: 10/040,226

(22) Filed: Jan. 3, 2002

(51) Int. Cl.[7] ..................... H04B 10/08
(52) U.S. Cl. ..................... 398/19; 398/12; 398/33
(58) Field of Search ..................... 398/12, 19, 30, 398/31, 32, 33, 50, 56; 370/244, 250, 251

(56) References Cited

U.S. PATENT DOCUMENTS

| | | | | |
|---|---|---|---|---|
| 5,229,876 A | | 7/1993 | Fatehi et al. | 398/157 |
| 5,457,556 A | * | 10/1995 | Shiragaki | 398/50 |
| 5,663,820 A | | 9/1997 | Shiragaki | 398/50 |
| 5,777,761 A | | 7/1998 | Fee | 398/7 |
| 5,867,289 A | * | 2/1999 | Gerstel et al. | 398/12 |
| 5,892,606 A | * | 4/1999 | Fatehi et al. | 398/181 |
| 5,914,794 A | | 6/1999 | Fee et al. | 398/20 |
| 5,956,165 A | | 9/1999 | Fee et al. | 398/78 |
| 6,101,010 A | * | 8/2000 | Konishi | 398/14 |
| 6,108,113 A | | 8/2000 | Fee | 398/16 |
| 6,285,475 B1 | | 9/2001 | Fee | 398/10 |
| 6,507,421 B1 | * | 1/2003 | Bishop et al. | 398/56 |
| 6,704,508 B1 | * | 3/2004 | Asahi | 398/30 |

* cited by examiner

*Primary Examiner*—Christina Y Leung

(57) ABSTRACT

To verify the integrity of optical paths through and among optical switches, optical signals are provided with co-propagating supplemental signals. The supplemental signals preferably have at least one characteristic which allows distinguishing one supplemental signal from another. Associated with a port of a switch, means are provided for detecting a supplemental signal and determining if the supplemental signal indicates that a desired optical signal is passing through the port as expected and desired. Means for imparting or changing the distinguishing characteristic of a supplemental signal may also be employed to facilitate verifying the passage of optical signals.

50 Claims, 14 Drawing Sheets

VERIFICATION OF PATH INTEGRITY IN OPTICAL SWITCH NETWORK

TECHNICAL FIELD

The present invention relates to optical communications and, in particular, to methods for verifying correct routing of optical signals in a network of optical communications switches.

BACKGROUND

A communications network serves to transport information among a number of locations and typically comprises various physical sites or 'nodes', interconnected by information conduits, called "links." Each link serves to carry information or data from one site to another site. Each site may contain equipment for combining, separating, transforming, conditioning, and/or routing data. These data may represent any combination of telephony, audio, video, or computer data in a variety of formats.

FIG. 1 shows an example communications network 100 comprising sites 101–105 connected by links 120–121. Links are generally implemented using electrical cables, satellites, radio or microwave signals, or optical connections and can stretch for tens or hundreds of miles between sites. Through these links, the communications network 100 carries data signals among the sites 101–105 to effectively interconnect data equipments 111–115, such as computers, remote terminals, file servers, etc. One or more links 120 and 121 that connect two sites are collectively referred to as a span 130. Sites 101–105 normally each comprise at least one cross-connect switch (either electrical or optical) and are in constant communication with a central network management system facility 140 which monitors the flow of traffic throughout the network.

Before the development of practical long-haul fiber links, a network, such as network 100, was commonly implemented in an all-electrical fashion using electrical cables or microwave paths as links in conjunction with switches and multiplexing equipment at the sites. A common high data rate signal to be switched and transported intact was the DS-3 signal, as standardized by the International Telecommunications Union(ITU), which carried data at around 45 megabits-per-second.

It is now preferable to use optical carrier signals to carry data along links from one site to another using optical fibers. Optical carrier signals are of such high frequency, around $10^{14}$ Hz, that they can be modulated at very high frequencies and can therefore carry data at an extremely high rate. For example, a standard SONET OC-192 modulated optical signal carries data at around 10 gigabits-per-second (10 Gbps).

FIG. 2 shows an example portion of a communications network wherein the links connecting sites are implemented as optical fiber links, yet the signals are switched in the electrical domain at each site. This may be referred to as an "optical/electrical" network. At each site the data-carrying signals are converted into the electrical domain to be routed through the digital cross-connect switches and perhaps processed in other ways. Collocated with the cross-connect switches at each site are so-called "lightwave terminal equipment" (LTE) which may comprise optical transmitters and receivers to couple data signals into and out of the optical fiber links.

In FIG. 2, a number of data signals to be transported are provided along data inputs 210 at a location called Site A.

Digital cross-connect switch (DCS) 212 may combine and reformulate the data signals to yield a composite data signal along connection 222 to LTE 224. LTE 224 applies line-coding and may also add framing and automatic error correction information. LTE 224 may in some cases package asynchronous data signals into the payload envelope of a synchronous optical transport system. Once the signal has been prepared for transmission, LTE 224 then uses the line-coded data signal to modulate an optical carrier emitted from an optical transmitter 226, which usually comprises a current-modulated laser diode. The optical signal from transmitter 226 is coupled into optical fiber 228, which connects to distant Site B and may extend for tens or hundreds of miles. At various points along optical fiber 228, an optical amplifier, such as amplifier 230, or other means may employed to strengthen the signal and to compensate for degradation caused by imperfections in the optical path.

At Site B, the optical fiber is coupled to an optical receiver 232 which is a part of LTE 234. By techniques that are well known in the art, LTE 234 interprets the received optical signal and recreates at output 236 the same data content provided at connection 222, thus accomplishing transport of the data from one location to another.

At Site B, the received data along output 236 enters DCS 214 whereupon the received data stream may be partially demultiplexed, combined, and routed to be sent to other sites, or may be "dropped" to make the received signal available to destinations in the vicinity of Site B. Other optical links in FIG. 2 operate in a similar manner to the link just described.

Of further note, it is common for many optical links to be established between a given pair of sites. A set of links interconnecting two sites are collectively referred to as a "span." Furthermore, it is common practice, particularly in telephony applications, to provide for corresponding pairs of directional links to be established between sites to accomplish bi-directional communications. A given LTE will often comprise numerous receivers and transmitters and may even couple multiple optical carriers, at different wavelengths, into and out of a single fiber.

In FIG. 2, the switching action of DCS 214 may accomplish redirection of individual data signals to either Site C or Site D. If a given data signal is introduced at Site A and is intended to be communicated to Site C, there are a variety of mechanisms to determine if the data signal is successfully reaching its destination. If the signal is disconnected or severely degraded due to a fiber cut or equipment malfunction, then electrical equipment, such as DCS 214, will not be able to synchronize with the signal (as is necessary to perform time slot interchange switching) and will declare a "loss of signal" or "loss of framing" alarm. The alarm indication will be reported whereupon a decision may be made to reroute the signal through an alternate link. It is fortunate that, in the electrical domain, the integrity of the signal is inherently checked at each point where the signal is received or switched. This allows for pinpointing the location of a failure and for deciding effective actions to circumvent a failure in the network.

For example, if LTE 234 or DCS 214 cannot detect or achieve synchronization with the signal from Site A, then an alarm is generated and reported to a network management system, such as system 140 as was shown in FIG. 1. Based upon other alarms from LTE 234, or even LTE 224, the network management system may determine that a failure has occurred, along fiber 228 for example, and may direct DCS 212 and DCS 214 to utilize optical fiber 240 as an alternate link.

As another example, assume that LTE 234 and DCS 214 indicate successful receipt of the signal incident along fiber 228, yet LTE 244 or DCS 216 indicate loss of the signal. These conditions are reported by the various elements to network management system 140 and correlated to determine that the failure is along fiber 242 or at LTE 246.

The hybrid optical/electrical approach depicted in FIG. 2 is presently in widespread use in the industry and offers substantial advantages over the older all-electrical systems. However, it is further desirable, for many practical reasons, to route modulated optical signals through a network entirely in optical form, that is, without having to convert an optical signal into an electrical equivalent until it reaches its destination.

Conversion of an optical signal into the electrical domain introduces many limitations. At each point where a modulated optical signal is received and converted into an electrical equivalent, the specific data rate and format, and in some cases the specific carrier wavelength, must be established so that the receiver is capable of accommodating the incoming signal. Aside from the hardware costs involved in receiving and re-transmitting an optical signal, the conversion to an electrical signal restricts the type of optical signals that may be carried through the network. When an upgrade to a higher data rate or different modulation format is desired, the electrical domain equipment handling signals must be changed. Furthermore, the conversion to an electrical signal limits the ability to handle a variety of signal bandwidths and formats which may be carried simultaneously within the same optical network. Restoration options are thus limited in the event of a sudden failure in the network. This was not such an issue in the older electrical networks that carried DS3 signals almost exclusively throughout.

Because of these limitations, manufacturers and network owners are striving to deploy completely transparent all-optical networks using optical cross-connect switches. These types of switches simply couple one optical path to another without having to receive or transduce the optical signal into an electrical signal. Regardless of what optical signals or modulation formats are propagated down the fiber, the optical carriers are routed by the optical cross-connect switches. Upgrades to higher data rates or formats can occur without any changes to the core network switches. Mixtures of data rates and formats are readily accommodated in a transparent all-optical network. It is desirable to create a transparent "core network" of optical cross-connect switches to carry and switch extremely large traffic channels.

It should be noted that some varieties of optical cross-connect switches are entirely transparent whereas others perform routing depending upon carrier wavelengths. However, both varieties are advantageous for being independent of the data modulation employed upon each optical carrier.

An example of a portion of an all-optical network is shown in FIG. 3 and maybe compared to the optical/electrical system of FIG. 2. Data signals presented for transmission at data inputs 310 are routed and combined into aggregate high-data rate signals within DCS 312 and electrically coupled to LTE 316 along connection 314. LTE 316 comprises optical transmitter 318 that emits an optical signal modulated with the data supplied by DCS 312. The modulated optical signal from transmitter 318 propagates through optical fiber 320 to eventually reach Site B.

At Site B, the optical signal is coupled into an input port 338 of an optical cross-connect switch (OCCS) 350 to be routed to one of many possible output ports. The switching action of OCCS 350 determines how each signal at an input port is redirected to a particular output port. And, because the output ports of a given OCCS may lead to many different remote sites, the switching of OCCS 350 accomplishes routing of optical signals to different physical destinations. In the present example, OCCS 350 may establish a light path between input port 338 and output port 340, effectively passing the signal from fiber 320 into fiber 328. This causes the optical signal from transmitter 318 to be received at receiver 330 in LTE 332, meaning that the data from input 310 and DCS 312 is available through DCS 334 and at output 336.

At Site B in FIG. 3, optical amplifier 322 is inserted in the optical path to boost the signal before entering OCCS 350. Some types of OCCS use a lossy switching matrix and it is advisable to pre-amplify weak signals before entering the switch. Optical amplifier 326 represents the common practice of amplifying optical signals after leaving an OCCS and upon reentering a fiber link. This compensates for losses experienced through the switch and provides a power boost to launch the optical signal through a long fiber link to the next site.

While the all-optical approach shown in FIG. 3 offers many worthwhile advantages, it introduces some new challenges. As described earlier, the traditional electrical networks and the more recent optical-electrical networks always received and interpreted at least portions (i.e. framing and parity information) of the data signal. Detection of the integrity of each data signal was inherently necessary at each point where the data signal was received, switched, or regenerated.

In contrast, in a transparent all-optical network approach, these aspects of the data signal are not routinely sampled. An optical cross-connect switch, such as OCCS 350, operates "blindly" without regard for the presence or absence of optical signals at its input and output ports. A malfunction in OCCS 350, or a mistaken instruction that controls OCCS 350, could cause an optical signal to be dead-ended or to be incorrectly routed to another site. In a network of optical cross-connect switches, the routing of a given signal is accomplished by issuing commands to several cross-connect switches, but there is generally no mechanism for verifying the proper routing of the optical signal except at its final destination.

Typically, a centralized or moderately distributed provisioning function coordinates the action of the cross-connect switches to accomplish routing of optical signals. The provisioning function usually maintains a database describing how the switches are interconnected in the network and relies upon the stored data to decide what switching commands to issue to the switches. Optical cross-connect switches are presumed to work properly, just like their electronic counterparts, and the database is assumed to accurately represent the interconnections in the network. But if a switch fails to connect ports in response to a command or the database inaccurately shows a link where none exists, then an optical signal may not reach its intended destination. Furthermore, there will be no indication of where along the path the optical signal has been misrouted. This problem may be exacerbated when restoration switching actions occur in the network that temporarily alter the connection topology.

What is required is a means for verifying, in a network of optical-domain switches, that optical data signals have been correctly switched and routed as intended and that the optical switching mechanisms are working properly. Furthermore, a means is desired for determining the location of a malfunctioning element so that traffic may be routed around it and repairs can be readily initiated. It is also desirable that any malfunctions within the switching mechanism of an optical switch be detected and noted locally so that the switch may declare a localized alarm or may alter its internal routing logic to circumvent the failure.

SUMMARY

The present invention is directed to a network of optical cross-connect switches with improved verification of the proper operation of the switches, the correct routing of signals in the network, and generally the integrity of optical paths presumed to be formed through the network. In one aspect of the present invention, the supplemental signal is co-propagated with a traffic-bearing optical signal. The supplemental signal is detected at the output ports of the switch in order to verify the operation of the switch and the correct routing of the optical signal to that point in its path.

In another aspect of the present invention, a supplemental signal is also detected at the input ports to the switch to verify correct routing of optical signals reaching the switch.

In yet another aspect of the present invention, a supplemental signal is injected at the input ports of an optical cross-connect switch and detected at the output ports of the optical cross-connect switch to determine correct routing of signals through the matrix of the cross-connect switch.

In another aspect of the present invention, supplemental signals that are already incident along input ports to a cross-connect switch are modified and the modified supplemental signals are detected at the output ports of the cross-connect switch to verify correct routing of signals through the switch.

In accordance with a preferred embodiment of the present invention the supplemental signal is an amplitude modulation subcarrier applied to a traffic-bearing optical carrier. However, the supplemental signal may comprise a frequency-modulation component, as may be preferable where Raman amplification is used along optical paths.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of illustrative embodiments when read in conjunction with the accompanying drawings, wherein:

DETAILED DESCRIPTION

To afford one of ordinary skill in the art a clear understanding of the present invention, various exemplary embodiments will now be described. These exemplary embodiments comprise optical switches, which may be of many varieties.

An optical switch may comprise a single switching element, such as a mechanical coupling switch or a Mach-Zehnder electo-optical switching element or a semiconductor optical amplifier that provides gain and coupling only when powered. An optical switch may also comprise a multitude of switching elements. It should be generally noted that where signal ports of such switches are referred to as being "input ports" or "output ports," some switches may in fact make no such distinction. Optical signals may propagate bidirectionally through a fiber and through many types of optical switches. Consequently, a given port may be considered an input port with respect to a signal entering the switch mechanism along a fiber and may also be considered an output port with respect to another signal propagating from the switch, emanating from the same port and into the same fiber.

Figure 8:
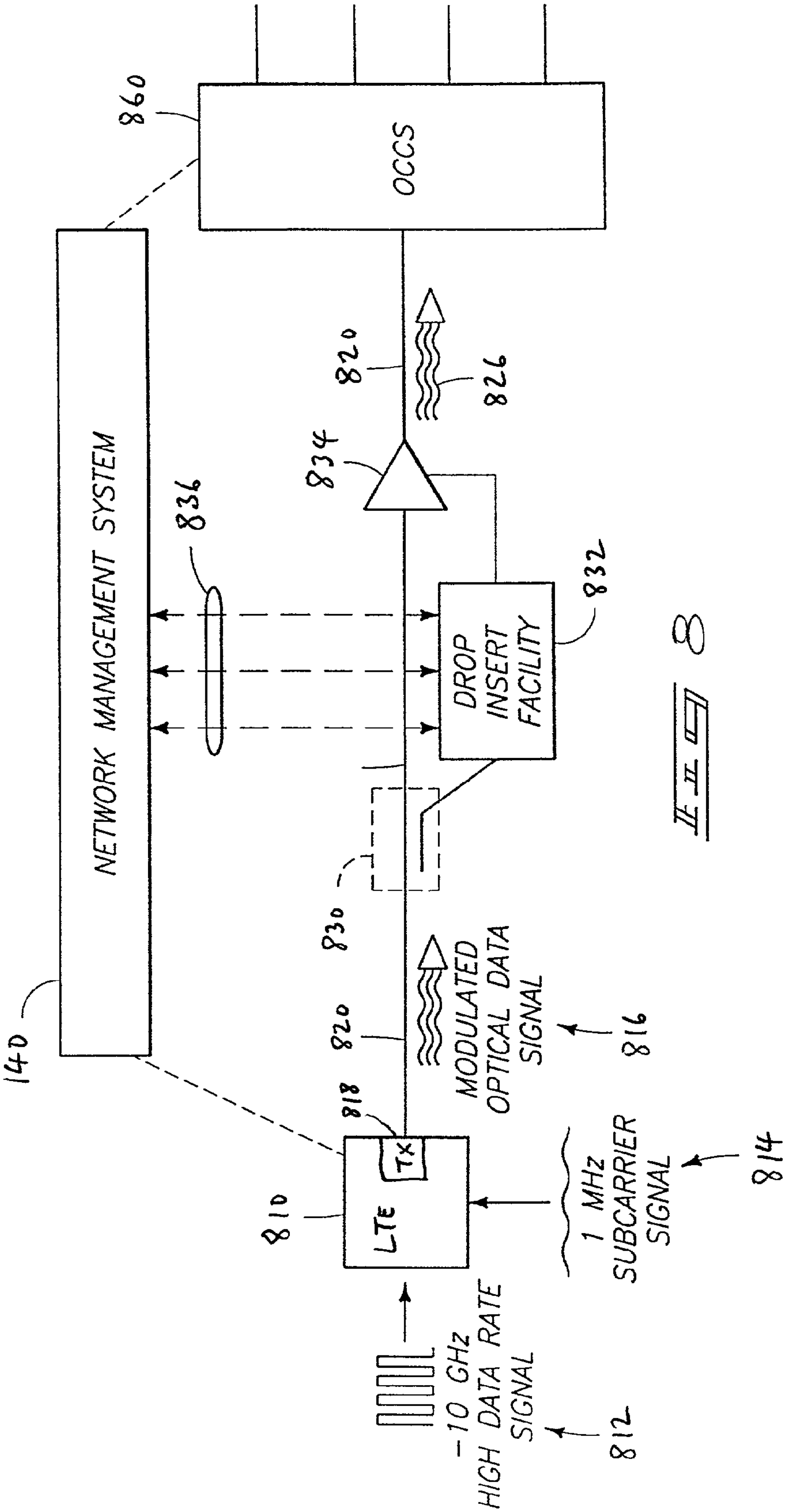
FIG. 8 depicts an all optical link in a communications network comprising a subcarrier drop-insert facility.

Referring now to FIG. 8 of the drawings, a technique is shown for superimposing a subcarrier signal upon a modulated optical carrier. This technique is described in greater detail in U.S. Pat. No. 6,285,475, but is briefly summarized herein. In FIG. 8, an optical Line Terminating Equipment (LTE) 810, comprising an optical transmitter 818, generates an optical signal 816 that is modulated by the summation of high data rate signal 812 and subcarrier signal 814. In a preferred embodiment, subcarrier signal 814 is substantially lower in frequency and affects optical signal 816 with much less modulation intensity than high data rate signal 812. As this composite optical data signal 816 propagates through an optical path, which may be a path through an all-optical network, the subcarrier may readily be detected and extracted by relatively inexpensive low-speed optical detectors without requiring detection, decoding, or transducing of the co-modulated high data rate signal. This subcarrier technique is useful for conveying information among intermediate and terminal points along an all-optical path and for keeping such information associated with each particular optical carrier regardless of wavelength-dependent routing. This technique for creating an optical carrier with a superimposed subcarrier may be performed within LTE 810 shown in FIG. 8.

FIG. 8 also depicts that, as optical signal 816 propagates through optical link 820, a drop insert facility 832 may be employed to read and alter the subcarrier portion of optical signal 816 without affecting or acting upon the associated high data rate modulation component and without requiring the conversion of the optical signal into an electrical signal. An optical coupler 830 is coupled to optical link 820 to tap off therefrom a small proportion of the energy of optical signal 816. The sampled optical signal is input to drop insert facility 832 wherein the subcarrier modulation is detected and processed as necessary to cause a desired modified optical signal 826 to be sent downstream of drop insert facility 832. As will be described further in conjunction with FIG. 9, drop insert facility 832 may assert changes to the subcarrier modulation upon signal 816 by gain modulating an optical amplifier 834.

In FIG. 8, drop insert facility is coupled to network management system (NMS) 140 through connection 836, by which drop insert facility 832 may report the receipt of certain subcarrier information or may provide alarm or status notifications. Through connection 836, NMS 140 may also direct drop insert facility 832 in performing modifications to the subcarrier content of signal 816. Accordingly, optical signal 816 may undergo modifications in its subcarrier content to yield modified optical signal 826 which then propagates onward to other network equipment, such as optical cross-connect switch (OCCS) 860.

Figure 9:
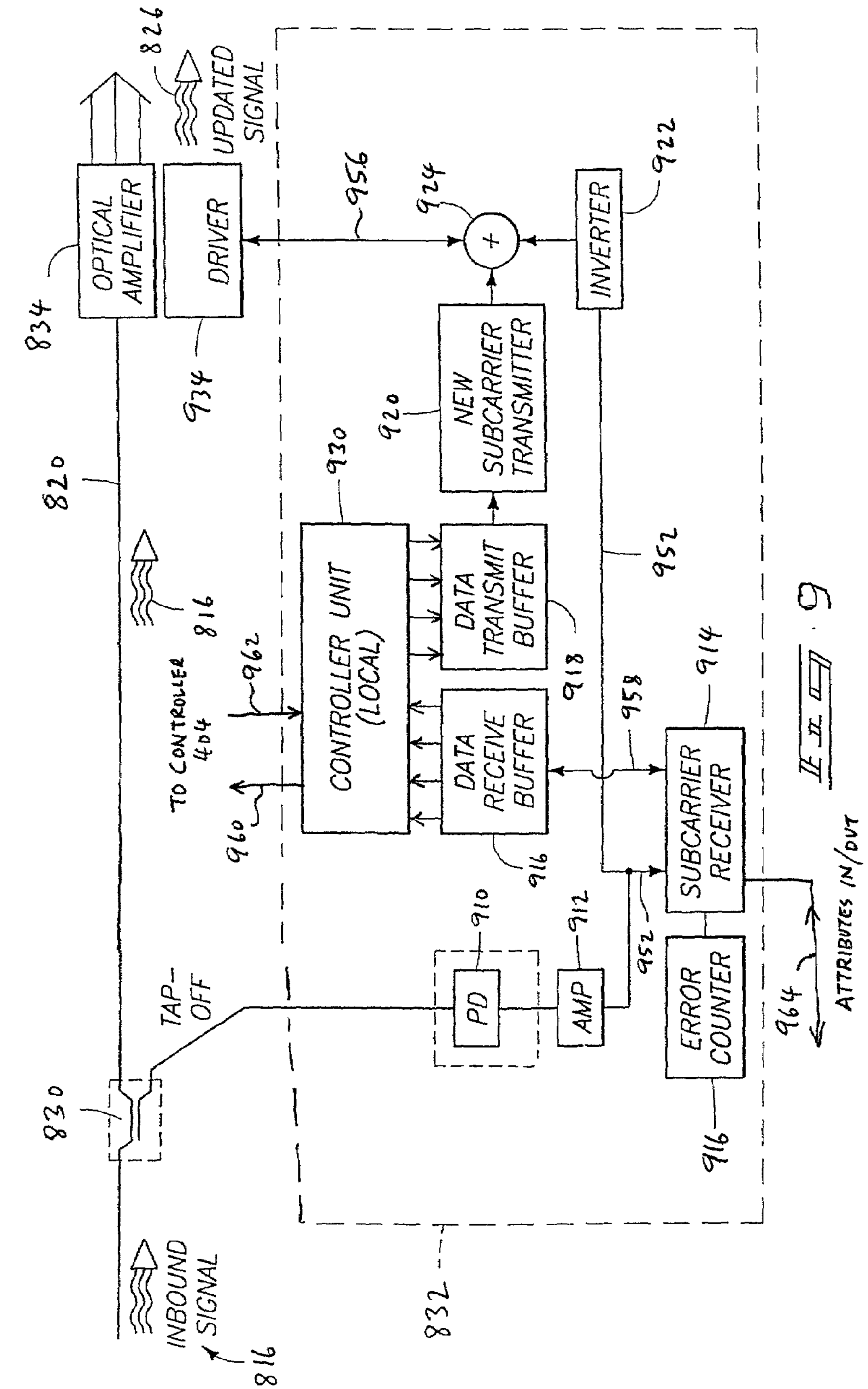
FIG. 9 is a block diagram of a subcarrier drop-insert facility in accordance with an embodiment of the present invention.

To instruct in an implementation of drop insert facility 832, FIG. 9 of the drawings briefly describes an embodiment as disclosed in U.S. Pat. No. 5,956,165 whereby the subcarrier content of an optical signal may be altered without transducing or decoding the high data rate modulation content of the optical signal.

In FIG. 9, a portion of optical signal 816 is tapped off by optical coupler 830 and directed into photodiode 910, which produces an electrical signal in response to the modulation of the incoming optical signal. Photodiode 910 (or other forms of detector) may be of simple and inexpensive design such that the modulation frequency response of the detector is inadequate to respond to the high data rate modulation but suffices to receive the lower frequency subcarrier modulation. Amplifier 912 amplifies the electrical signal and may impose some frequency filtering characteristics as well. For example, the composite frequency response of both photodiode 910 and amplifier 912 may be tailored to allow only subcarrier modulation frequencies to appear at the output of amplifier 912, while filtering out any frequencies above or below the desired passband.

The resulting signal along connection 952 is coupled to subcarrier receiver 914 and inverter 922. Subcarrier receiver 914 detects the presence of a subcarrier component and may extract information or attributes therefrom. Subcarrier receiver 914 discriminates the raw electrical signal along connection 952 into a data stream along connection 954, and may perform gain control, linearization, clock recovery, and thresholding by techniques that are well known in the art.

An error counter 916 may be coupled to subcarrier receiver 914 to observe the incidence of errors such as might occur where digital data is conveyed by a subcarrier component of optical signal 816. The error count or measurement from error counter 916 may be reported to a network management system or may be used locally, for example, to affect whether received data is acted upon or ignored. An error count or measurement from error counter 916 may also be used to gage the quality of the signal path along which signal 816 has propagated. This aspect may be useful for monitoring path degradation and performing fault isolation.

Another useful connection with receiver 914 is attribute data connection 964. Through this connection receiver 914 may provide attributes of a received subcarrier, such as frequency or amplitude of the subcarrier. It is also possible that through this connection receiver 914 may receive instructions as to a particular subcarrier to be detected. Where multiple subcarriers may be present, receiver 914 may be directed to selectively receive one of the subcarriers based on a given frequency or a code-division multiple access (CDMA) code.

The data output 958 of subcarrier receiver 914, which may represent data conveyed by the subcarrier component, is coupled into a data receive buffer 916 which collects the data and may hold the data temporarily until controller 930 can process the data. Controller 930 determines what data has been received, what data must be sent, and how a subcarrier must be modified to accomplish the sending of data as needed. Controller 930 may communicate with a network management system to establish what data must be sent in the subcarrier component of an outgoing optical signal 826. Along receive data output 960, controller 930 may provide output of the received data that has been obtained from inbound signal 816 by subcarrier receiver 914. Along transmit data input 962, controller 930 may receive data that is to be modulated onto the outbound updated signal 826. Controller 930 sets outgoing data into data transmit buffer 918 so that the outgoing data be provided to new subcarrier transmitter 920. New subcarrier transmitter 920 may create a modulation signal having a fixed bit rate and may therefore may draw data from data transmit buffer 920 at a given clock rate. In one possible implementation, data transmit buffer 918 may hold an "image" of a digital signal that is to be transmitted and new subcarrier signal 920 may continuously cycle through the image and send the contents of data transmit buffer 918. In this manner, controller 930 need only write to data transmit buffer whenever the transmit image must change from what it was previously.

In any case, the data from the data transmit buffer is converted in transmitter 920 into a form suitable for being sent as a subcarrier signal. The output of transmitter 920 may amount to a serial data stream or may be a subcarrier modulated in frequency, amplitude, or otherwise, in a similar manner to received optical signal 816. The output of transmitter 920 is coupled to a summing point 924. Another signal entering summing point 924 is from inverter 922. Inverter 922 accepts a raw subcarrier electrical signal along connection 952 and creates an inverted analog signal that is the negative of the originally received subcarrier signal transduced by photodiode 910. The output of summing point 924 present along connection 956 is coupled to optical amplifier 834 through optical amplifier driver 934.

In the case of a fiber amplifier, such as an erbium-doped fiber amplifier, driver 934 may comprise a pump laser whose intensity is modulated by the input along connection 956. Alternatively, where optical amplifier 834 is of the semiconductor variety, driver 934 may comprise current or voltage controlling circuitry which may be caused to vary the gain of the amplifier in response to input along connection 956. Semiconductor amplifiers can provide linear amplification into the 80 GHz range, meaning that the bandwidth of a subcarrier signal may be quite high.

In either case, the coupling of an inverted form of the original subcarrier modulation through inverter 922 and summing point 924 causes the effective cancellation of same from the outbound optical signal 826. Furthermore, the addition of a new subcarrier modulation signal to summing point 924 causes the new subcarrier information to appear on outbound optical signal 826. The net effect is that new subcarrier information replaces that which was received, without acting upon the high data rate aspects of the optical carrier in any way.

Referring back now to FIG. 3 of the drawings, LTE 316 creates an optical signal by virtue of transmitter 318. The modulated optical signal propagates through fiber 320 and enters optical cross-connect switch (OCCS) 324 at site "B." The signal created by transmitter 318 may comprise a supplementary signal that is also received at input port 338 of OCCS 324. The signal entering input port 338 may undergo switching within OCCS 324 and be directed to any one of the output ports, such as output port 340. Furthermore, as mentioned earlier, the supplemental signal may carry data and comprise a unique tag that identifies the optical signal generated by transmitter 318. The data, including the unique tag, may be detected by relatively inexpensive low-bandwidth detectors coupled to the optical path.

Figure 4:
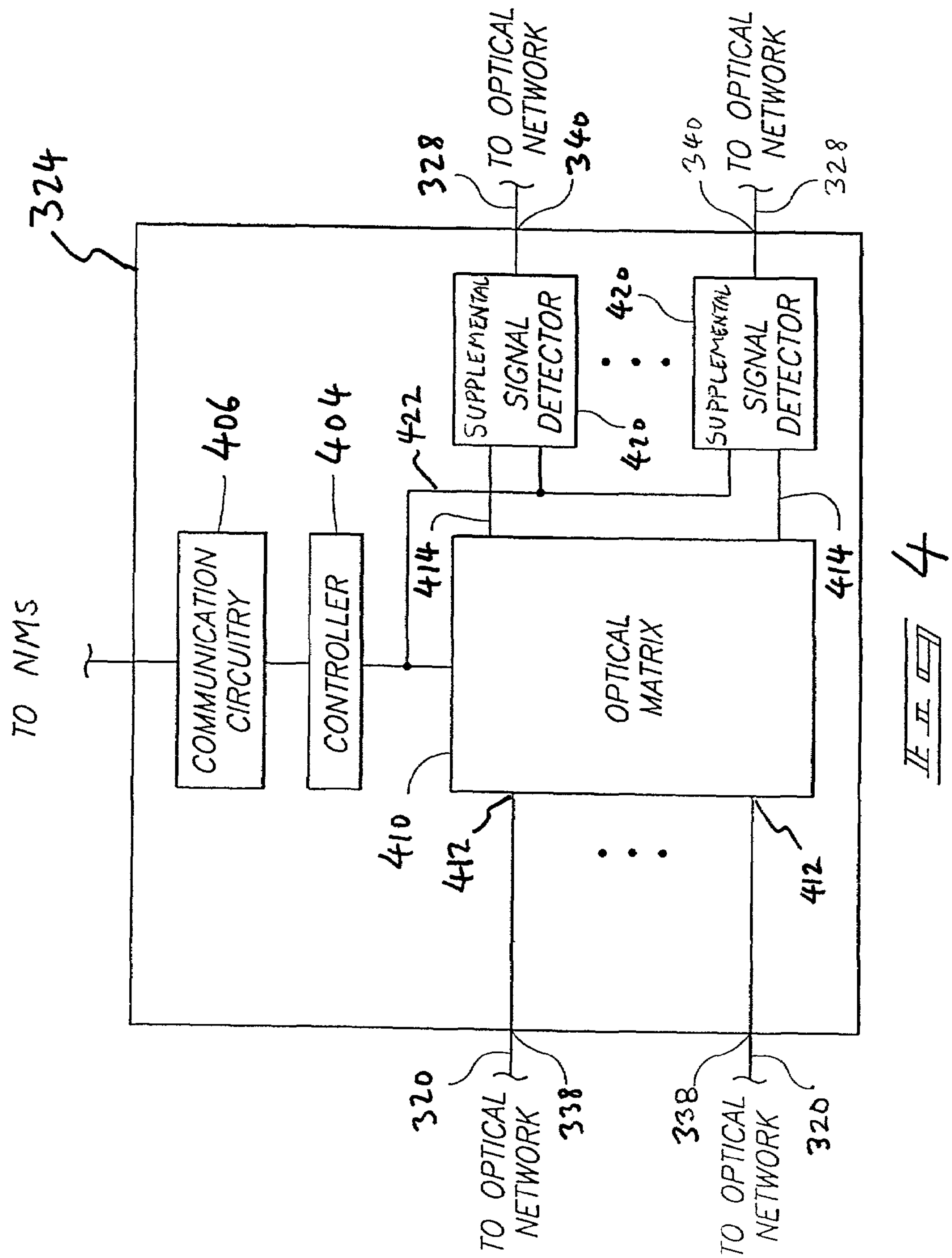
FIG. 4 is a block diagram of an optical cross-connect switch comprising supplemental signal detectors at its output ports in accordance with an embodiment of the present invention.

Turning now to FIG. 4, an optical cross-connect switch in accordance with a preferred embodiment of the present invention is shown comprising supplemental signal detectors at the output ports. OCCS 324 is shown to comprise several elements which are typically included in an optical cross-connect switch, namely optical matrix 410, controller 404, and communications circuitry 406. Optical matrix 410 serves to perform connection of optical paths between input ports and output ports of the matrix. Optical cross-connect controller 404 exercises control over optical matrix 410. In response to requests to connect certain input ports to certain output ports, controller 404 coordinates the switching action of individual switching elements in optical matrix 410 in order to accomplish the desired interconnection. Controller 404 is also coupled to communication circuitry 406 so that OCCS 324 may communicate to a remote system such as a network management system 140. A network management system 140 may issue connection requests to OCCS 324 to provision paths in the network where needed.

Optical signals to be switched by optical matrix 410 enter the OCCS 324 along a optical fiber 320 coupled to an input port 338. As described above, an optical signal incident along optical fiber 320 may comprise a supplemental signal generated elsewhere in the network. This optical fiber connection then enters the optical matrix at matrix input port 412. Typically, many such input ports 338 and corresponding matrix input ports 412 are employed within a single OCCS 324. In addition, numerous output ports from the optical matrix 414 are shown which are carried to output port 340 of OCCS 324 and coupled to a fiber 328. Fiber 328 typically is a fiber link that leads to another remote optical cross-connect switch in the network or to terminal equipment such as LTE 316 in FIG. 3.

In accordance with a preferred embodiment of the present invention, an optical signal having an associated supplemental signal enters OCCS 324 along input port 338 which is coupled to matrix input port 412. By the action of optical matrix 410 under the control of controller 404, the signal incident at matrix input port 412 may appear at one of the selected matrix output ports 414. The supplemental signal incident along fiber 320 through matrix input port 412 will have a unique attribute that may be readily detected. For example, a supplemental signal may be distinguished by such attributes as frequency, amplitude, phase or modulation characteristics, including data represented by modulation. A supplemental signal attribute may even be used to convey an attribute of an associated optical signal. For example, a supplemental signal may be modulated to carry data and the data may describe the wavelength of the associated optical carrier signal that the supplemental signal is modulated upon or otherwise associated with. As another example, the frequency of a subcarrier may map to a wavelength for the corresponding optical signal.

The attributes may represent information, at the very least by way of identifying the signal. Whether an attribute of the supplemental signal itself or the information that may be encoded thereon by modulation, it may be generally said that a supplemental signal may be created having one or more attributes or characteristics that represent information content.

For an output port 414 that is intended to receive or conduct the optical signal that was incident along fiber 320, an associated supplemental signal detector 420 is receptive to the supplemental signal associated with the conducted optical signal. Upon detection of the expected supplemental signal, supplemental signal detector 420 communicates to controller 404 via control link 422 indicating receipt of a supplemental signal and conveying information from, or attributes of, the detected supplemental signal. Controller 404 notes the receipt of the supplemental signal and may maintain a historical memory of reported attributes, such as amplitude, to look for trends that may reveal subtle or slow degradations in the transmission of the signal.

From an external source, controller 404 may also receive information describing whether a supplemental signal should be expected and what attributes the supplemental signal should exhibit. Provided with this information, controller 404 may locally interpret whether the supplemental signal is being received as expected and initiate a meaningful alarm notification accordingly.

Controller 404 may compare the anticipated supplemental signal information that was obtained from a remote system to the supplemental signal information that was received locally by supplemental signal detector 420. If the locally detected supplemental signal information matches what is anticipated, then generally no alarm indication is issued by controller 404 nor reported to network management system 140.

Figure 1:
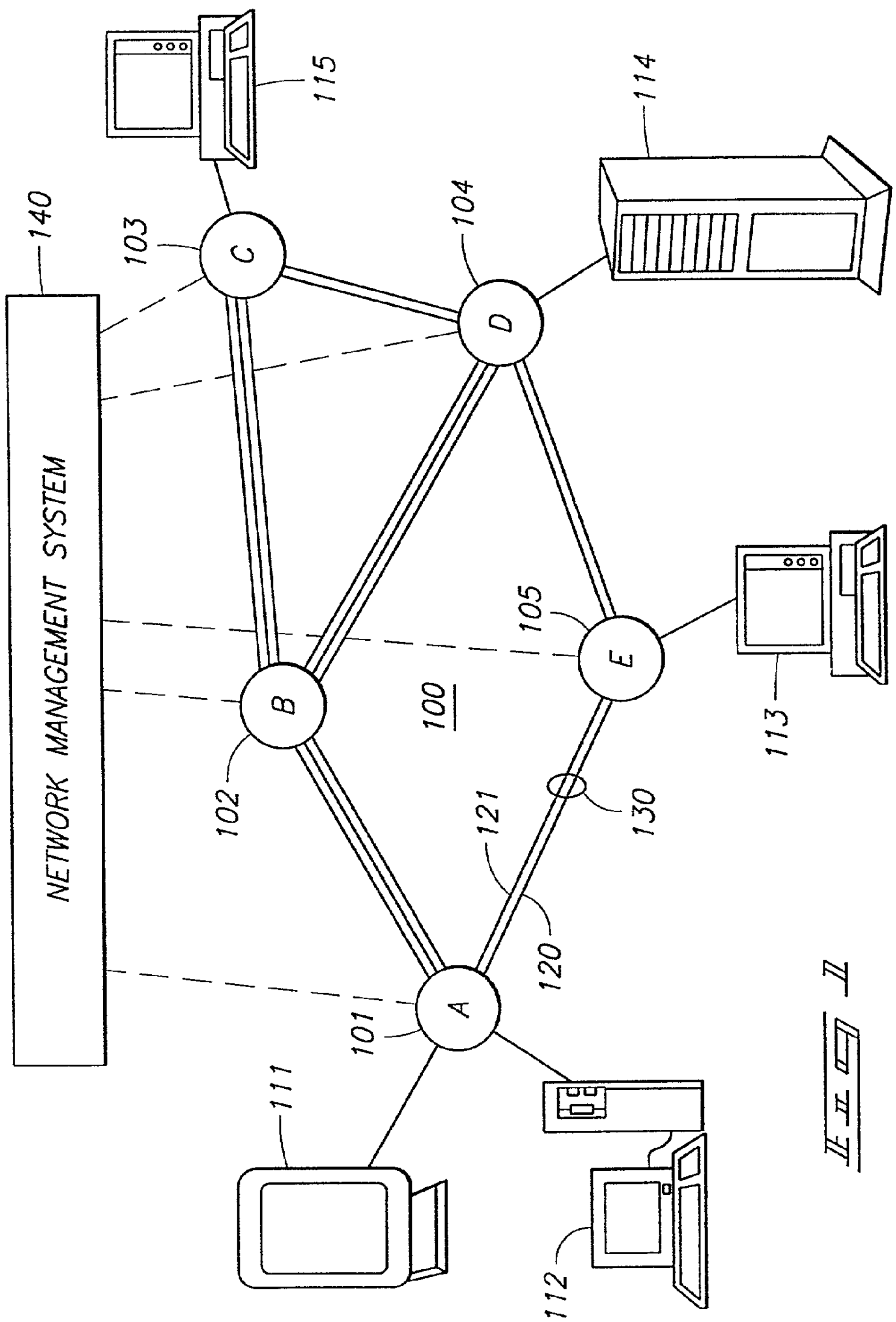
FIG. 1 is a block diagram of a typical communications network.
Figure 2:
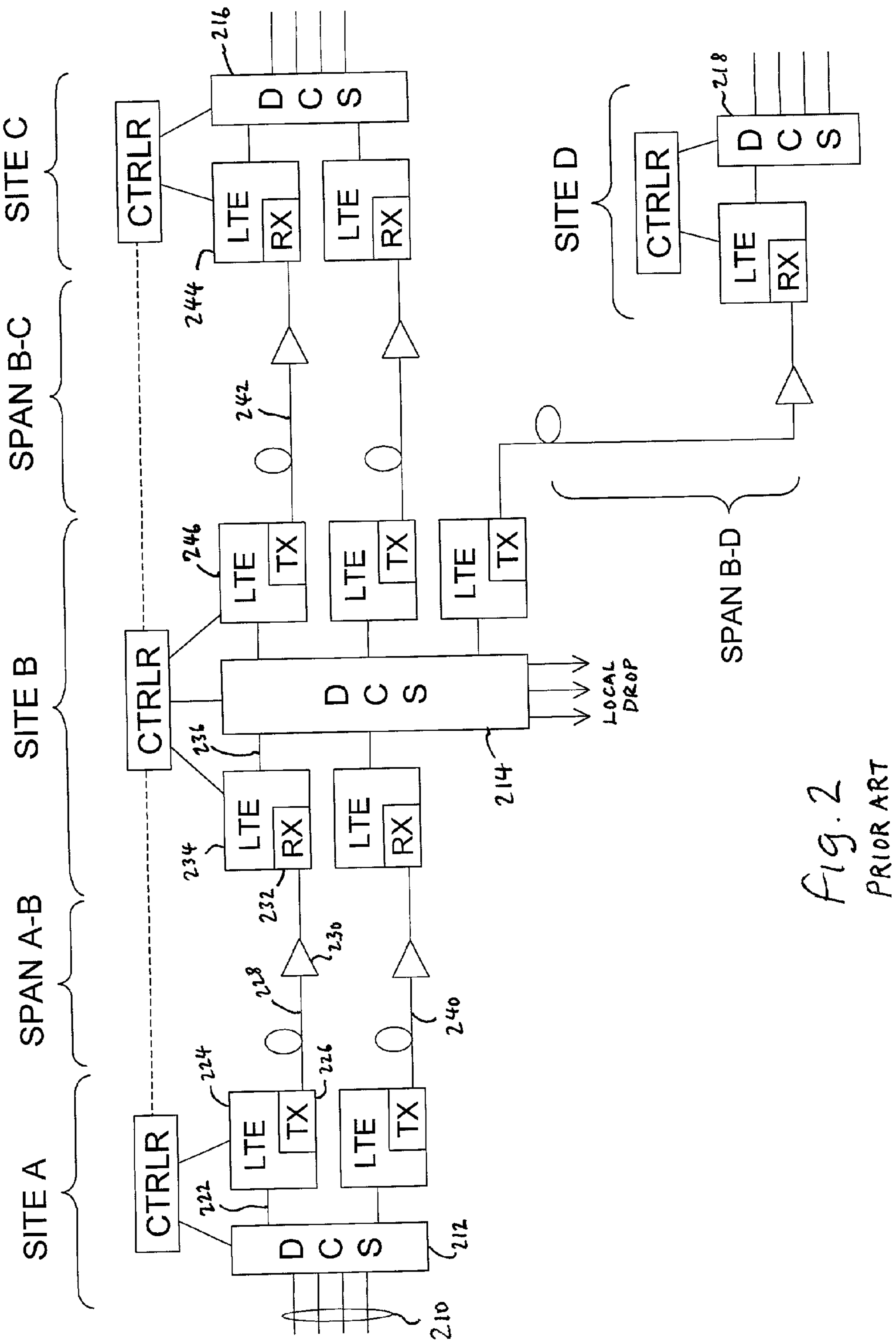
FIG. 2 depicts a portion of an electrical/optical communications network in accordance with the prior art.
Figure 3:
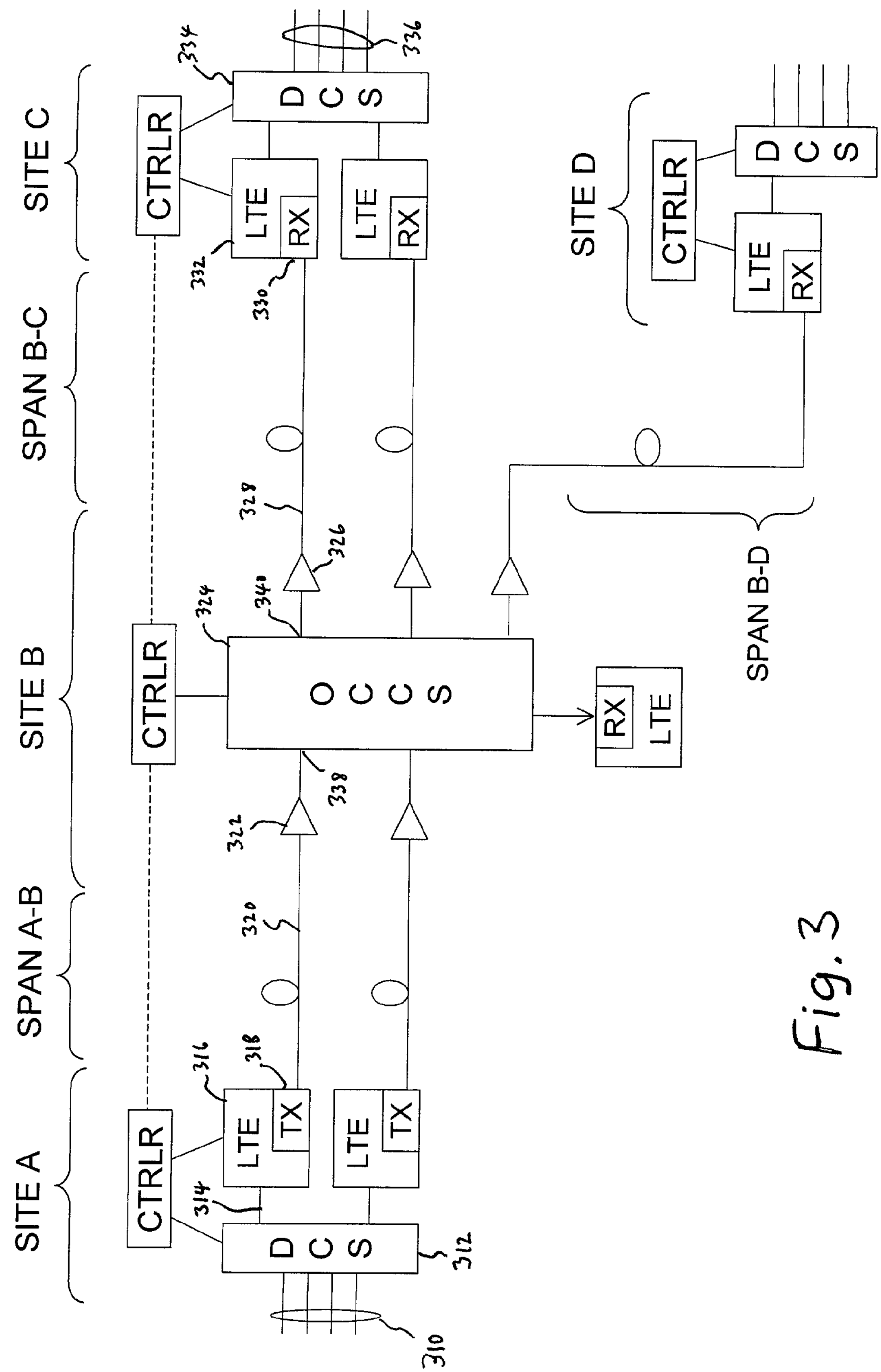
FIG. 3 depicts a portion of an all optical communications network.

The anticipated supplemental signal information may be communicated through a network management system 140 from an upstream transmitter, such as transmitter 318 in FIG. 3. Alternatively, network management system 140 may actively determine what characteristic information is to be imparted to a supplemental signal at transmitter 318 and may also communicate to controller 404 what supplemental signal information to expect if the optical signal from transmitter 318 is routed properly. Note that this continuity checking determines both the integrity of optical link 320 and the correct functioning of optical matrix 410 in routing the optical signal to the appropriate output port 414.

The supplemental signal detector 420 may be constructed in numerous ways using an inexpensive low-bandwidth photo-detector coupled to the optical path. One such arrangement is taught in U.S. Pat. No. 6,285,475 and a similar arrangement is shown as part of FIG. 9. Supplemental signal detector 420 comprises an optical tap which removes a small portion of the signal from the optical line. The optical signal extracted by the optical tap is coupled into a photo-detector, such as an avalanche photo-diode or a PIN diode, which transduces the optical signal into an electrical signal. This electrical version of the signal may then be amplified and fed into a detector of some nature to look for particular signal characteristics or modulation within the supplemental signal. With the arrangement of FIG. 4 it is possible at an OCCS 324 to determine whether or not an optical signal is properly being received along a fiber 320 and being coupled to a particular output port 414. A method of operating the arrangement of FIG. 4 is presented later in FIG. 10.

Figure 5:
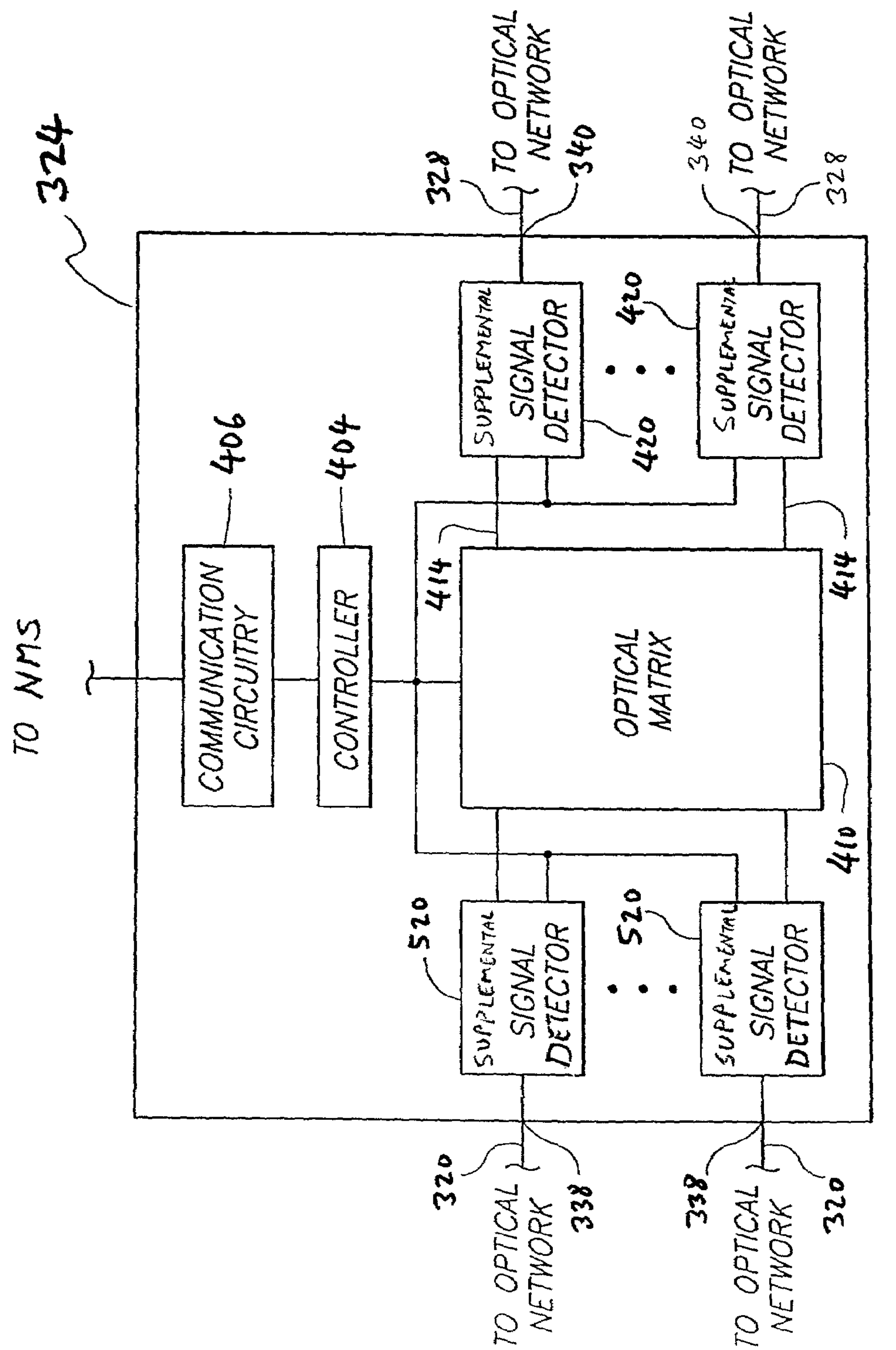
FIG. 5 is a block diagram of an optical cross-connect switch comprising supplemental signal detectors at both its input ports and output ports in accordance with an embodiment of the present invention.
Figure 10:
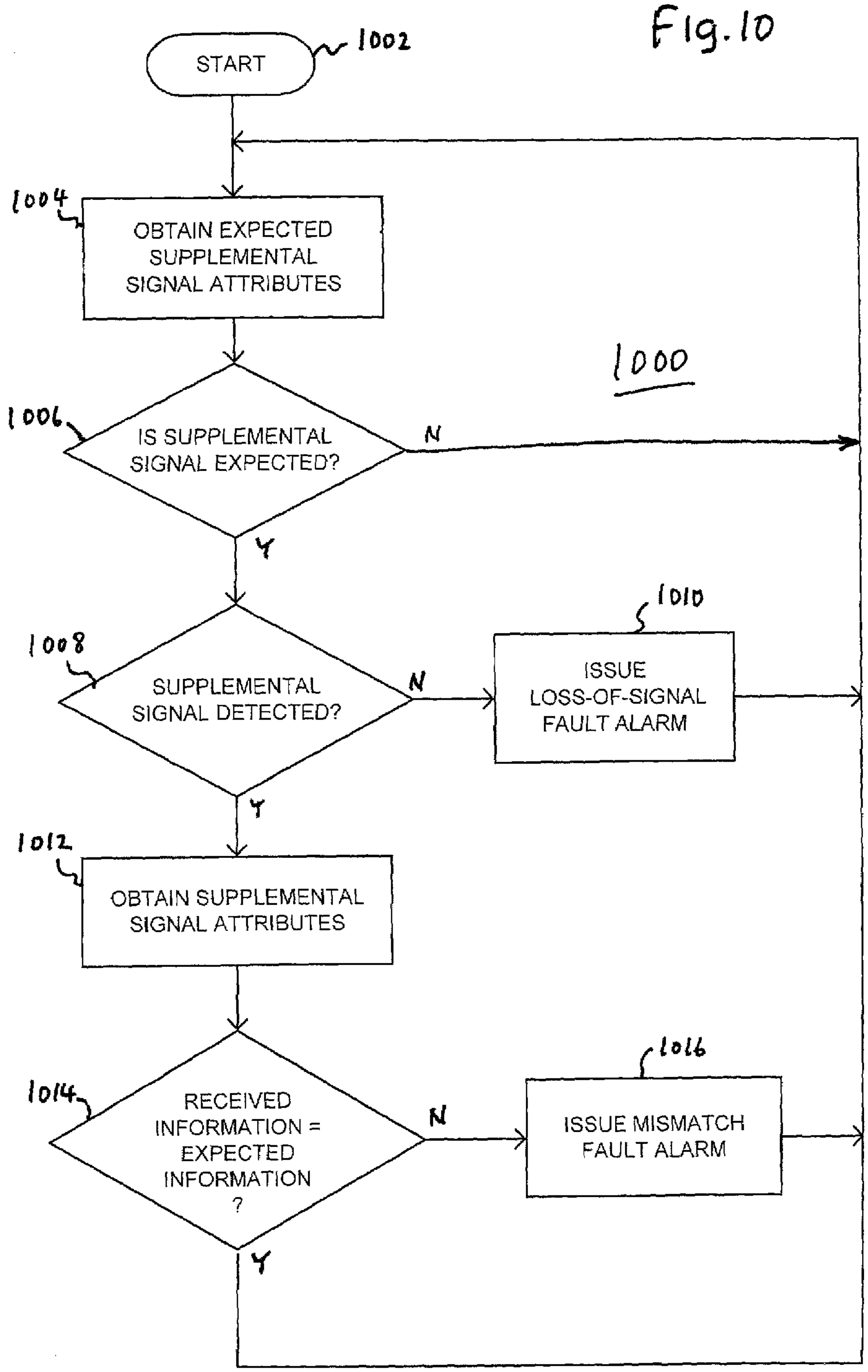
FIG. 10 is a flowchart describing a process by which a supplemental detector validates a received supplemental signal.
Figure 13:
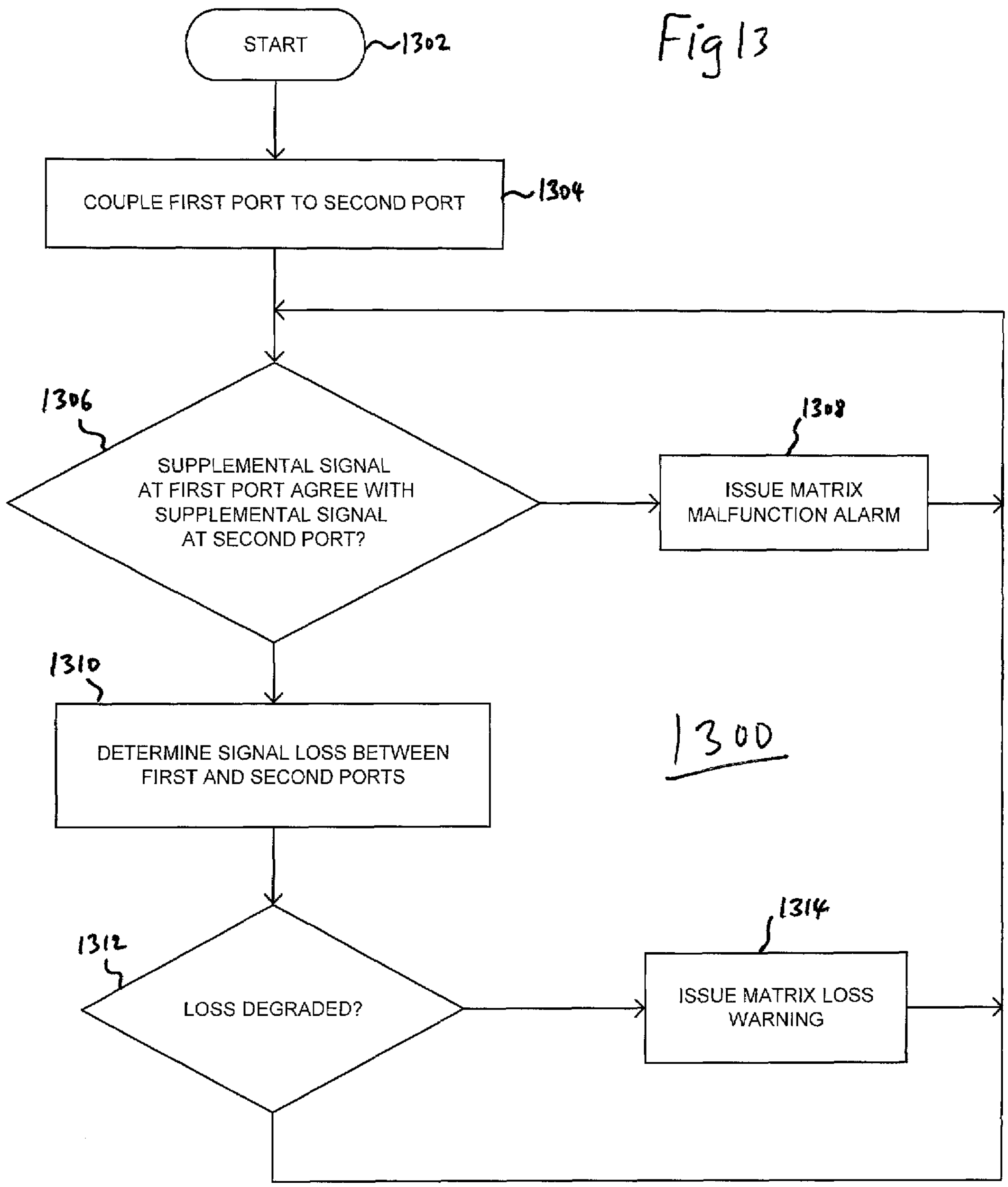
FIG. 13 is a flowchart describing a process for comparing supplemental signals before and after passage through an optical switching matrix.

Referring now to FIG. 5 of the drawings, an OCCS 324 is shown similar to that shown in FIG. 4. In FIG. 5 however, OCCS 324 is shown to further comprise supplemental signal detectors 520 inserted in-line between an incoming optical fiber link 320 and the optical matrix input port 412. Supplemental signal detector 520 reports signals that it detects to controller 404, as do supplemental signal detectors 420. The purpose of supplemental signal detector 520 is to distinguish between supplemental signals received along fiber 320 versus supplemental signals that have traversed both fiber 320 and optical matrix 410. Having both signal detectors 420 and 520 allows OCCS 324 to distinguish between misroutings due to external causes versus misroutings due to malfunction of optical matrix 410. FIG. 10 and FIG. 13, presented later, describe methods by which the arrangement of FIG. 5 may be used.

It is further contemplated that reports from numerous supplemental signal detectors along a path or throughout a network may be collected at a central location where the information maybe correlated to deduce the origination and path traversal for each supplemental signal. This form of operation may be viewed as an all-optical counterpart for how the section and line trace overhead is commonly used in SONET signals.

Figure 6:
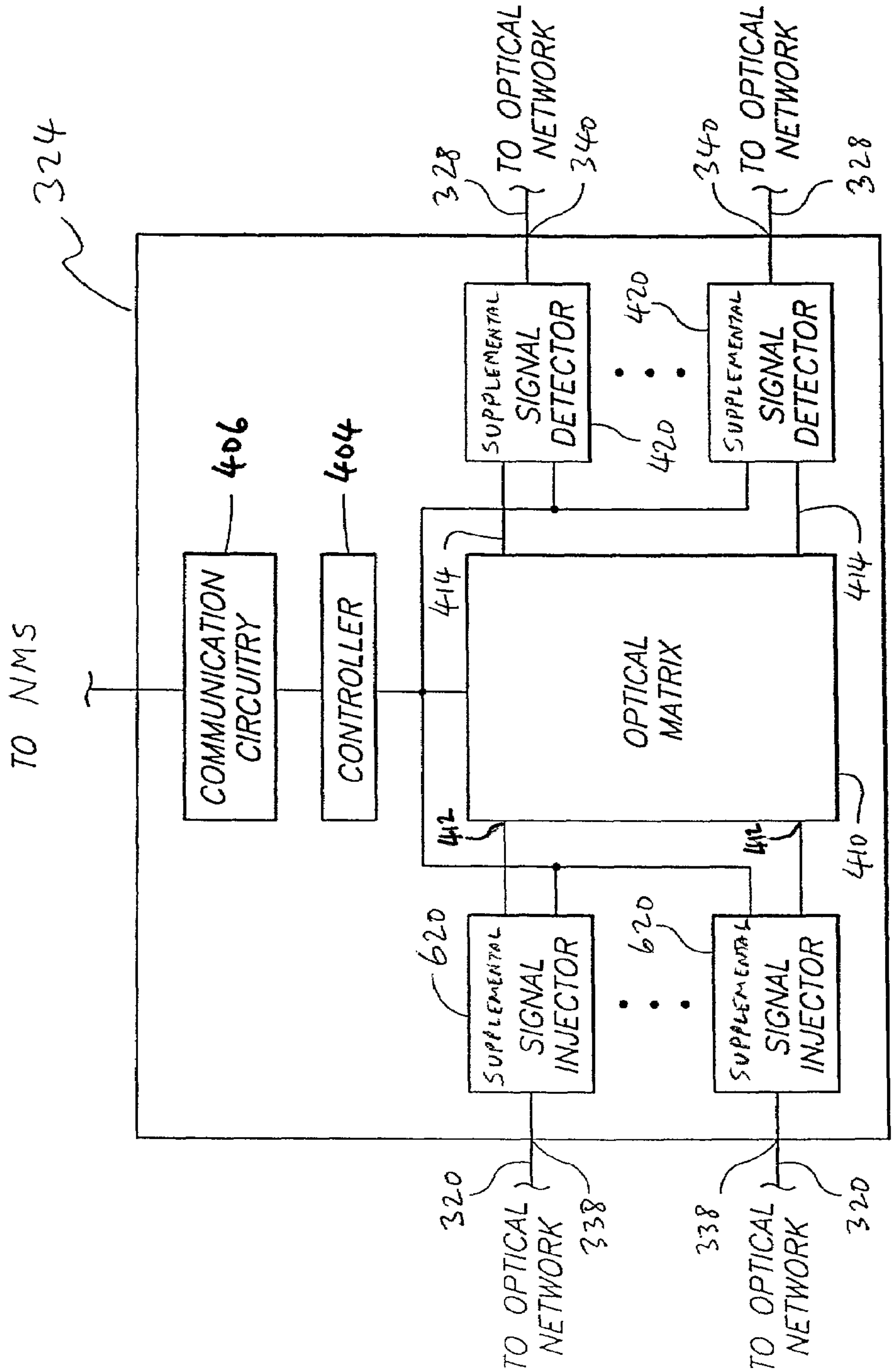
FIG. 6 is a block diagram of an optical cross-connect switch comprising supplemental signal detectors at its outputs and optical signal injectors at its input ports in accordance with an embodiment of the present invention.

FIG. 6 of the drawings shows OCCS 324 comprising supplemental signal injectors 620 inserted in-line between fiber 320 and matrix input port 410. Supplemental signal injector 620 imparts characteristic information or attributes to the supplemental signal which is applied to the optical signal passing from fiber 320 to matrix input port 412. Supplemental signal injector 620 may receive commands from controller 404 as to what characteristic information or attributes are to be used along a given matrix input port 412.

After passing through optical matrix 410 along with an associated traffic-bearing optical carrier, the supplemental signal is detected by one of the supplemental signal detectors 420 which reports receipt of the supplemental signal to controller 404. In this manner, OCCS 324 may coordinate a self-contained evaluation of the performance of optical matrix 410. Furthermore, supplemental signal detectors 420 may be equipped to monitor the amplitude of the carrier signals or supplemental signals and to report changes in signal level which indicate increased attenuation through OCCS 324. This technique may be used to detect and report degradation in the operation of OCCS 324.

In FIG. 6, optical supplemental signal injector 620 applies a supplemental signal to the optical carrier, which may be in addition to other supplemental signals already present on a passing optical carrier. Supplemental signal injector may, under the direction of controller 404, apply a signal that is distinguishable in some respect from other supplemental signals already present on the optical carriers passing through. A supplemental signal detector may observe either or both of the locally and remotely applied supplemental signals and make determinations singly or in combination.

Figure 7:
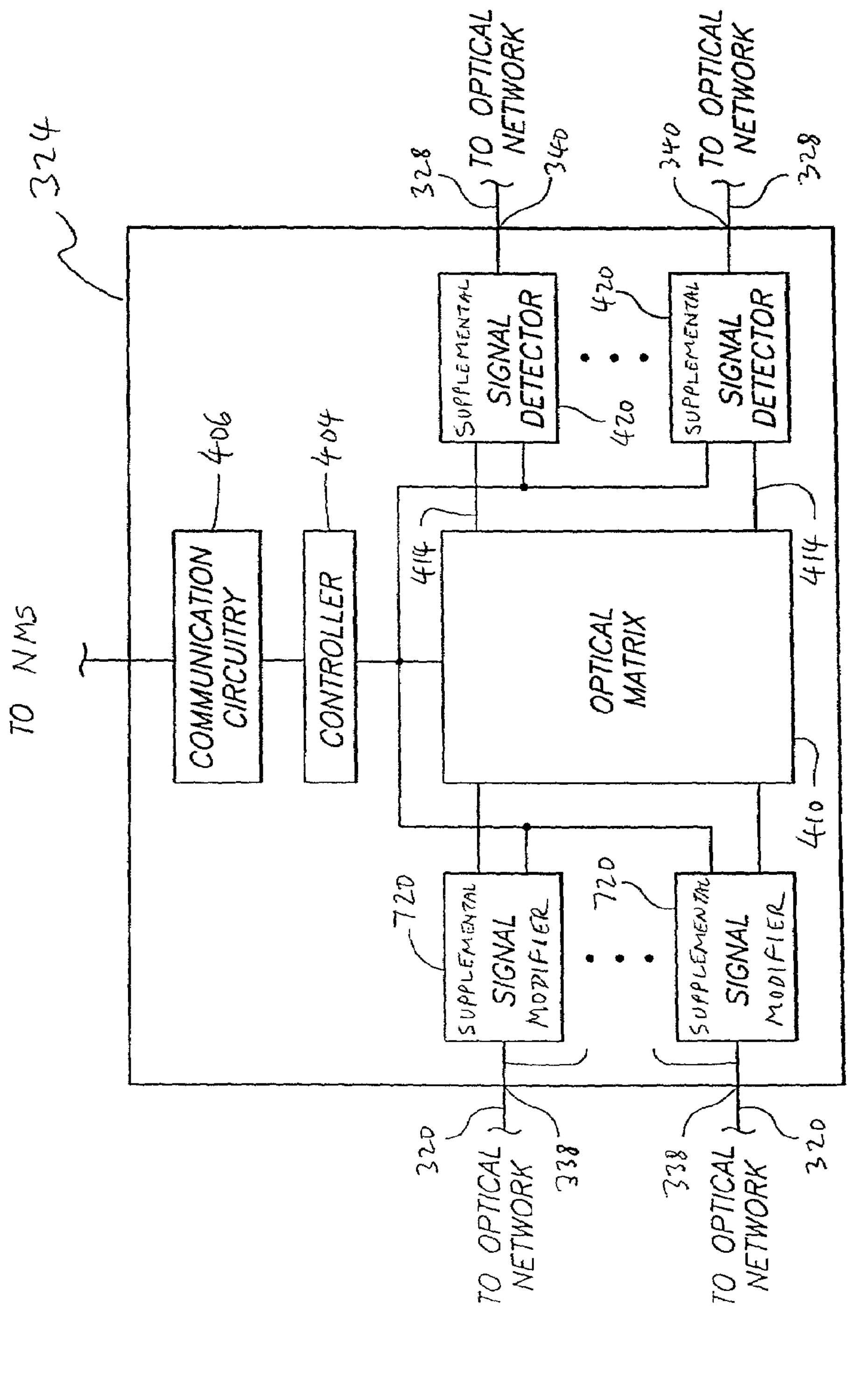
FIG. 7 is a block diagram of a optical cross-connect switch comprising supplemental signal detectors at its output ports and optical signal modifiers at its input ports in accordance with an embodiment of the present invention.

FIG. 7 of the drawings shows OCCS 324 comprising supplemental signal modifier 720. Supplemental signal modifier 720 accepts supplemental signals already present in an optical carrier incident along fiber 320 and acts to change or add information to the signal which may then be detected by supplemental signal detector 420 coupled to the output ports of the optical matrix 410. This may be done so that supplemental signal detectors 420 can simultaneously determine whether a correct signal is received along fiber 320 and was properly routed though optical matrix 410.

Along an optical path through a network, each supplemental signal modifier 720 may also simultaneously function as a detector and may provide an output of detected signal information in much the same manner as detector 420. (See the description provided for connections 960 and 964 in FIG. 9.) In some cases where the arrangement of FIG. 7 is used, a comparison may be made between inbound and outbound signals as was mentioned for FIG. 5.

Furthermore, supplemental signal modifier 720 may be used to accumulate a set of signatures along an optical path so that, by examining the supplemental signal, one can ascertain all of the optical cross-connect switches that the optical signal has traversed thus far. An example of this cumulative mode of operation is provided in U.S. Pat. No. 6,108,113. If the supplemental signal contains an accumulation of signatures and a supplemental signal modifier 720 adds yet another signature to the supplemental signal, then signal detector 420 will detect a composite supplemental signal that may be readily disassembled to determine even the supplemental signal that was present before being modified by modifier 720.

In other words, where the effect of the modifier on the supplemental signal is cumulative, the need to perform separate detection at the modifier may be obviated because the detector can infer the supplemental signal before modification from the supplemental signal detected after modification. Many other variations are possible wherein the pre-modification supplemental signal may be inferred from the post-modification signal. Another example of this occurs where the supplemental signal comprises an ordinal counting aspect and the modifier simply increments or otherwise changes the count in a predictable way.

Assuming that the modification, such as a digital bit string, is unique among the input ports, then the correct operation of the local switching matrix is confirmed if the modification applied by the modifier is present in the supplemental signal detected after the matrix. Once this condition is established, then the remainder of the supplemental signal may be compared to expectations, with any discrepancies being attributable to routing mistakes elsewhere in the network.

Referring now to FIG. 10 of the drawings, a process is shown whereby an optical cross-connect switch may detect supplemental signals and issue alarms accordingly. The process of FIG. 10 may be executed by, for example, OCCS 324 depicted in FIG. 4 and may execute within controller 404 of OCCS 324. Controller 404 may take the form of a general purpose computer and the process of FIG. 10 may be implemented as software instructions operating within controller 404.

The process of FIG. 10 starts at step 1002 upon initializing an optical cross-connect or a network system, such as at the time of initial power-up. The remainder of the process of FIG. 10 is a loop that is repeated for as long as power is applied to the system. After the system is started and initialized in step 1002, execution proceeds immediately to step 1004. In step 1004, information about an inbound supplemental signal is obtained from, for example, a remote location through network management system 140. This information may indicate whether a supplemental signal is at all expected along a given port and may further indicate attributes of supplemental signal.

One possible attribute may be information that is expected to be present upon the supplemental signal, in turn representing the supplemental signal information that was applied by a transmitter 318 in originating the optical signal. It is also foreseen that network management system 140, or the like, may command transmitter 318 to apply certain information to a supplemental signal and at the same time inform an OCCS 324 as to what information to expect in a received supplemental signal corresponding to the same signal transmitted by transmitter 318. Regardless of how this action takes place, step 1004 merely refers to obtaining the information that is expected to be upon a supplemental signal appearing at a particular port of the switch and expected to be detected by a given supplemental signal detector 420. After obtaining this information in step 1004, step 1006 is executed to determine if a supplemental signal is expected at all. If no supplemental signal is expected to be detected by a given supplemental signal detector 420, then the decision made in step 1006 is negative and execution simply returns to step 1004 and the loop continues to, in effect, poll for whether any new information regarding an incoming supplemental signal has been received.

If on the other hand, in step 1006, a supplemental signal is expected to be received, then execution proceeds to decision step 1008 wherein it is determined whether a supplemental signal detector 420 is in fact receiving a supplemental signal. If not, then execution continues at step 1010 resulting in the issuance of a "loss-of-signal" fault alarm to the OCCS controller 404. This loss-of-signal indication would signify that the expected supplemental signal is not being received where it was expected to be received. This alarm indication may be indicative of a fault in the network and may be reported furthermore to a network management system 140. This information may be used at a network level by the network management system 140 to determine that a malfunction has occurred, to locate a malfunction, and to take actions to circumvent a possible failure in the network. Alternatively, the loss-of-signal alarm that originates in step 1010 may be used locally by controller 404 to assess the operation of OCCS 324 and, in particular, of optical matrix 410. In response to this indication, controller 404 may take action within OCCS 324 to circumvent a possible failure of switching elements within optical matrix 410.

In addition to detecting loss of and expected signal at a particular port, it is possible to monitor receipt of the errant signal at all other ports to further pinpoint the malfunction and to take corrective actions.

Returning to step 1008, if the determination is made that a supplemental signal is being received as expected, then execution proceeds to step 1012 where attributes are derived from the supplemental signal. This would take place within supplemental signal detector 420, for example. Attributes of the supplemental signal may include frequency, amplitude, code-division multiple access, or data encoded within the supplemental signal, for example.

Process 1000 then continues execution at step 1014 wherein the attributes of detected supplemental signal are compared to the expected attributes obtained in step 1004 earlier. If the detected supplemental signal attributes as determined in step 1012 do not match the expected attributes derived in step 1004, then execution proceeds to step 1016 and a mismatch fault alarm is issued. In a similar fashion to the handling of the alarm created in step 1010, a mismatch alarm created by step 1016 may be communicated to and used by network management system 140 at the network level or by controller 404 at the local level. When the condition exists that the detected supplemental signal attributes are not equal to the expected attributes, this indicates that somewhere the routing has gone wrong and indicates a possible malfunction of optical matrix 410, of erroneous commands given to OCCS 324 from perhaps network management system 140, or of failure of equipment "upstream" of OCCS 324.

Therefore, the mismatch fault alarm of step 1016 may serve many valuable purposes. It is contemplated that, in an optical cross-connect network, the location at which the signal may have been misrouted before reaching OCCS 324 may be determined by observing mismatch alarms from other network elements or by reading cumulative path information as may be encoded in information borne on the received signal.

Returning now to step 1014, if the determination is made that the detected supplemental signal attributes in step 1012 are consistent with the expected supplemental signal attributes determined in step 1004, then no alarm is issued and execution simply returns to step 1004 which continues the loop of process 1000 for continually making the comparison of the expected attributes to the detected attributes.

Note that process 1000 of FIG. 10 may also be readily adapted to the OCCS 324 as shown in FIG. 5 which comprises supplemental signal detectors at the inputs to the optical matrix 410. As will now be apparent to one of ordinary skill in the art, the presence of supplemental signal detectors 520 prior to optical matrix 410 allows controller 404 to distinguish possible misroutings or malfunctions upstream of OCCS 324 from any misroutings that may occur by malfunction of optical matrix 410 or incorrect commands issued thereto. A method for processing detected signals before and after an optical switch matrix is described later in FIG. 13.

Figure 11:
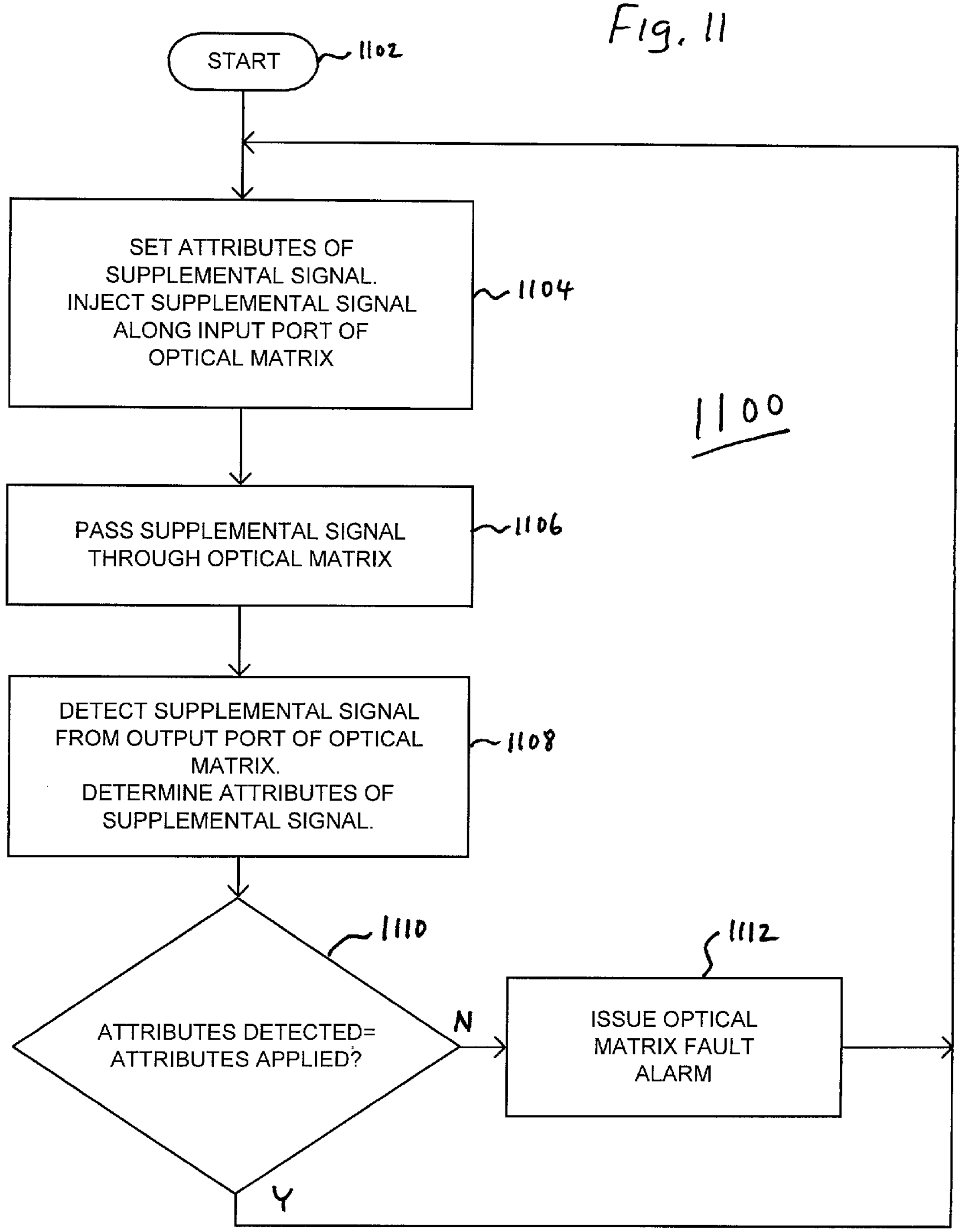
FIG. 11 is a flowchart describing a process in an optical cross-connect switch for applying a supplemental signal to an input port, detecting the supplemental signal at an output port, and comparing the signals to verify the correct operation of the optical cross-connect switch.

Turning now to FIG. 11 of the drawings, a process 1100 is shown that is applicable to an OCCS that employs supplemental signal injectors at the inputs to an optical matrix 410 as shown in FIG. 6 of the drawings. The process of FIG. 11 starts at step 1102 upon power-up and initialization of the overall system and then process execution proceeds immediately to step 1104 and the remainder of process of 1100 is a loop that is executed for as long as power is applied to the system. Process 1100 may be implemented under software control within controller 404. In step 1104, a supplemental signal is applied to optical carriers entering OCCS 324 along input port 338.

This supplemental signal may take many forms. In a preferred embodiment of the present invention, the supplemental signal injected by supplemental signal injectors 620 is a subcarrier used to amplitude modulate the carrier and is superimposed upon the traffic bearing high-data rate modulation already applied to the carrier. Of course, the supplemental signal may be also imposed on the carrier by frequency modulation or pulse modulation or other forms. The subcarrier is preferably of substantially lower frequency and amplitude than the high data rate modulation applied to the optical carrier. A means for injecting in the optical domain a subcarrier signal superimposed upon an existing optical carrier is disclosed U.S. Pat. No. 5,956,165.

Once a supplemental signal has been added to an optical carrier in step 1104, then, in step 1106, the optical carrier that has been supplemented passes through the optical matrix 410. Through optical matrix 410, the optical signal is coupled to one of the output ports of the optical matrix and is detected by a supplemental signal detector in step 1108. Also in step 1108, at least one attribute of the supplemental signal is extracted from the signal. Then, in step 1110, the attribute of the supplemental signal as detected in step 1108 is compared to the attribute presumably established for the supplemental signal resulting from step 1104. If there is a mismatch between these, then execution proceeds to step 1112 and an alarm is issued indicating the cross-connect switch has malfunctioned. This is evidence that the optical matrix 410 has malfunctioned because a known optical signal was injected at an input port but did not appear at the output port that would be appropriate if the optical matrix were operating correctly. On the other hand, in step 1110, if the detected supplemental signal information does equal the same information that was applied to the supplemental signal before entering the optical matrix, then no alarm is issued and execution continues returns to step 1104 and process 1100 effectively continues to poll for proper operation of the optical cross-connect switch. It is contemplated that an arrangement is possible wherein multiple processors or processes are used, with one performing continuous polling and another performing troubleshooting and fault location.

It is noteworthy that a supplemental signal locally injected in step 1104 may be in addition to other supplemental signals already present in an incoming optical signal. A supplemental signal detector may observe either or both of the locally and remotely applied supplemental signals and make determinations singly or in combination. By the appropriate choice of attributes, locally and remotely added supplemental signals may be distinguished by a detector. Those of skill in the art will appreciate that various processes described herein may be used in combination for determining whether detected supplemental signals are, on the whole, being received as expected. For example, it may be possible for a supplemental signal detector to detect a remotely added signal at one frequency and a locally injected signal at another signal and to independently assess the correctness of each. Where a locally injected signal is detected correctly yet a remotely added signal component is incorrect, the optical cross-connect switch may properly declare a routing fault external to the switch.

Figure 12:
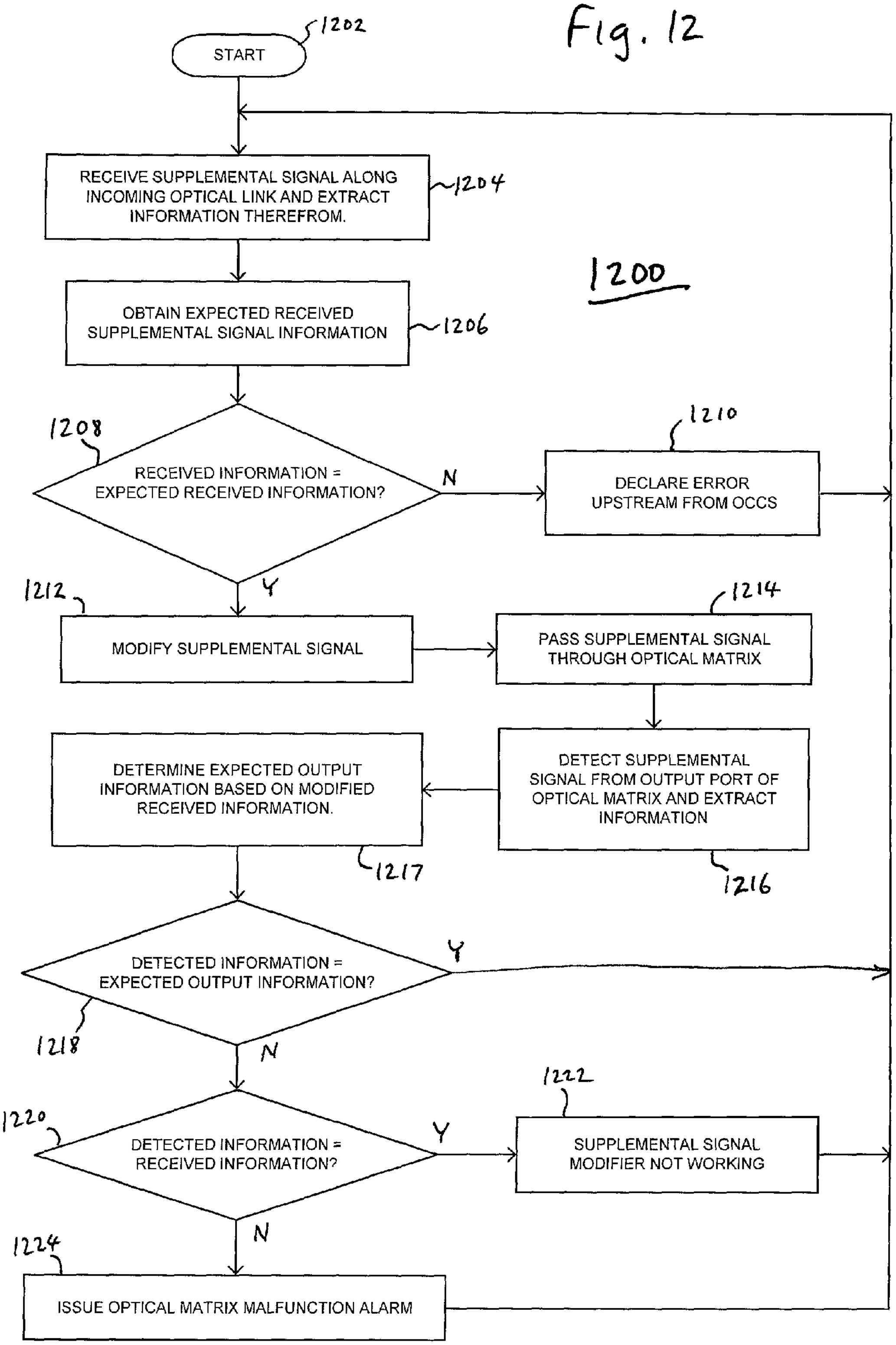
FIG. 12 is flowchart describing a process in an optical cross-connect switch whereby a supplemental signal is modified at an input port, detected at an output port, and the two versions of the signal are compared to verify proper operation of the optical cross-connect switch and of correct routing in the path comprising the optical cross-connect switch.

Turning now to FIG. 12 of the drawings, a process 1200 is shown by which a suitably equipped optical cross-connect switch may receive supplemental signals from incoming optical fiber connections, may detect supplemental information within those signals, may modify the information content of the supplemental signals prior to passing the information through the optical matrix 410, and then may detect the supplemental signals at the output ports of its optical matrix. Process 1200 may be implemented for example, as software instructions within an optical cross-connect controller 404.

Process 1200 begins with step 1202 corresponding to initial power up, start up and initialization of the system or of the particular optical cross-connect switch. The remainder of process 1200 is a loop for, in effect, constantly polling to ensure correct operation of the optical cross-connect switch and of other components in the network.

After start up and initialization in step 1202, execution proceeds to step 1204 wherein the supplemental information is detected and received substantially near the input to the optical cross-connect switch. Then, in step 1206, information regarding what supplemental signal is expected to have been received at each input port to the optical cross-connect switch is obtained either locally or from a remote system, such as network management system 140. It is further contemplated that such information as to what supplemental signal information or attributes to expect may be derived from an upstream optical cross-connect switch along a given optical path.

After executing step 1206, then step 1208 is executed to determine whether the information or attributes received and detected in step 1204 match the information or attributes that are expected to be received in step 1206. If there is a mismatch determined in step 1208, then execution proceeds to step 1210 whereupon a fault alarm or "line error" is declared indicating that there is a problem with the information or the identity of the signal coming into the optical cross-connect switch. After declaring an alarm in step 1210, then execution returns to step 1204 so that polling continues.

Returning to step 1208, if the detected incoming supplemental information matches what was expected to have been received, then execution proceeds to step 1212 where the supplemental signal is augmented or otherwise modified with information that is a) specific to the context of OCCS 324 and b) distinguishable from any aspects of the supplemental signal that were already present as it entered the optical cross-connect switch. Then, in step 1214, the modified supplemental signal is passed through optical cross-connect matrix 410 and, in step 1216, is detected at the output ports of the optical matrix by supplemental signal detectors 420. Next, in step 1217, information is determined about the supplemental signal expected to be observed at the output port assuming the modification of step 1212 and coupling of step 1214 have occurred correctly. Finally, in step 1218, the signal received by the supplemental signal detectors is compared to the signal as modified in step 1212 and if they compare favorably then execution simply returns to step 1204 and the polling loop of process of 1200 continues.

If, on the other hand, the supplemental signal detected at a particular output port does not match the modified supplemental signal that was injected at a corresponding input port, this signifies malfunction of optical matrix 410 and execution proceeds to step 1220. If the detected supplemental signal information happens to match the supplemental signal information that was originally received in step 1204 prior to being modified in step 1212, then, in step 1222, an alarm is issued indicating that the process of injecting or modifying the supplemental signal within supplemental signal injector 720 is not working properly. This is a useful self-checking provision so that the traffic path is not subjected to restoration activities if the fault actually lies within the supplemental signal equipment itself.

Otherwise if, in step 1220, the detected supplemental signal does not match either of the original version or the modified version of the incoming supplemental signal then, finally, in step 1224, an alarm is issued indicating a malfunction of the optical matrix and execution returns to step 1204 to continue the polling as to the status of the optical cross-connect switch.

Those of ordinary skill in the art will recognize that a similar approach to injecting or modifying supplemental signals coming into a optical matrix and applying supplemental signal detectors to receive and detect such signals may also be applied even within the internal elements of an optical matrix in order to better pinpoint switching elements that are malfunctioning. Injection and detection of the supplemental signal may also be accomplished in various ways and various places within the optical cross-connect matrix. For example, if the switching elements are electro-optic or semiconductor optical amplifiers then a slight modulation may be applied even to the switching element in order to superimpose modulation upon the optical carrier.

As is evident in the arrangement of FIG. 9, it is possible that at least one implementation of a supplemental signal modifier may also serve as a supplemental signal detector and may provide an output to the OCCS of information arriving on the inbound optical signal. This allows for modes of operation similar to FIG. 10 or FIG. 13. In light of the present disclosure, those of ordinary skill in the art may readily combine various techniques taught herein to utilize the receive output of a supplemental signal modifier for verifying optical signal routing.

FIG. 13 depicts a method for verifying optical signal routing through a switch matrix and is generally applicable to any arrangement wherein a known signal entering the matrix may be compared to a detected signal exiting the matrix. Process 1300 begins with step 1302 upon power up and initialization of a cross-connect switch. In step 1304, a first optical port is coupled to a second optical port through the cross-connect matrix of the switch. Presumably, then, an optical signal entering the first port will be emitted from the second port substantially intact.

As described herein, it is possible that the optical signal entering the first port may have a co-propagating supplemental signal component. This supplemental signal may originate locally or remotely. If such a supplemental signal exists, then it is expected that the supplemental signal will be present at the second port once coupling has occurred according to step 1304. If it is known, by whatever means, what supplemental signal is present along the first port but no matching supplemental signal is present at the second port, then the optical matrix has clearly failed to accomplish the intended coupling of step 1304.

It is also possible that there may be no optical signal present at the first port or that there may be no supplemental signal therewith. In this case, it is expected that no supplemental signal will be present at the second port once coupling has occurred according to step 1304. If it is known, by whatever means, that no supplemental signal is present along the first port, yet a supplemental signal is present at the second port, then the optical matrix has incorrectly coupled a signal from some other port to the second port.

Thus, after attempting a coupling in step 1304, step 1306 is performed to compare a supplemental signal, if any, known to be present at the first port to a supplemental signal observed at the second port. If the known supplemental signal input at the first port is not in agreement with the observed supplemental signal at the second port, then a matrix malfunction fault alarm is declared in step 1308 and the process loops back to step 1306 to continually monitor for agreement between the input and output.

If, in step 1306, the input and output supplemental signals are consistent with one another as described above, then no matrix malfunction alarm need be declared and the process continues with step 1310 to perform a comparison of signal amplitudes.

In step 1310, the amplitude of the supplemental signal at the first port is compared to that at the second port and a net signal loss or gain is calculated. As those of skill in the art will appreciate, a path through an optical switch may entail loss or gain depending on many factors, such as whether the switch uses active elements or passive elements. Loss or gain in itself may not present a problem, but it is expected that such loss or gain should remain consistent through a given combination of ports. Degraded performance of elements in the switch may cause increased loss through the switch. Loss through a switch or along a path is another aspect of path integrity that may be verified or monitored in accordance with the present invention. Steps 1310 and 1312 are performed for monitoring the loss through the switch and detecting degradation.

Step 1312 involves comparing the loss measurement from step 1310 to historical or expected values for the loss and determining if a noteworthy degradation has occurred. If degradation has occurred, then, in step 1314, a matrix loss warning is issued by the optical cross-connect switch and may be reported externally to a network management system. Otherwise the process simply returns to step 1306 to continue monitoring the agreement between input and output signals. Of course, as an alternative, these steps may be executed just once or a few times immediately after switching activities or just occasionally after the initial switching.

As those of ordinary skill will recognize, process 1300 is applicable at least to the arrangements depicted in FIGS. 4–7 and may be performed cooperatively with the processes of FIGS. 10–12.

Figure 14:
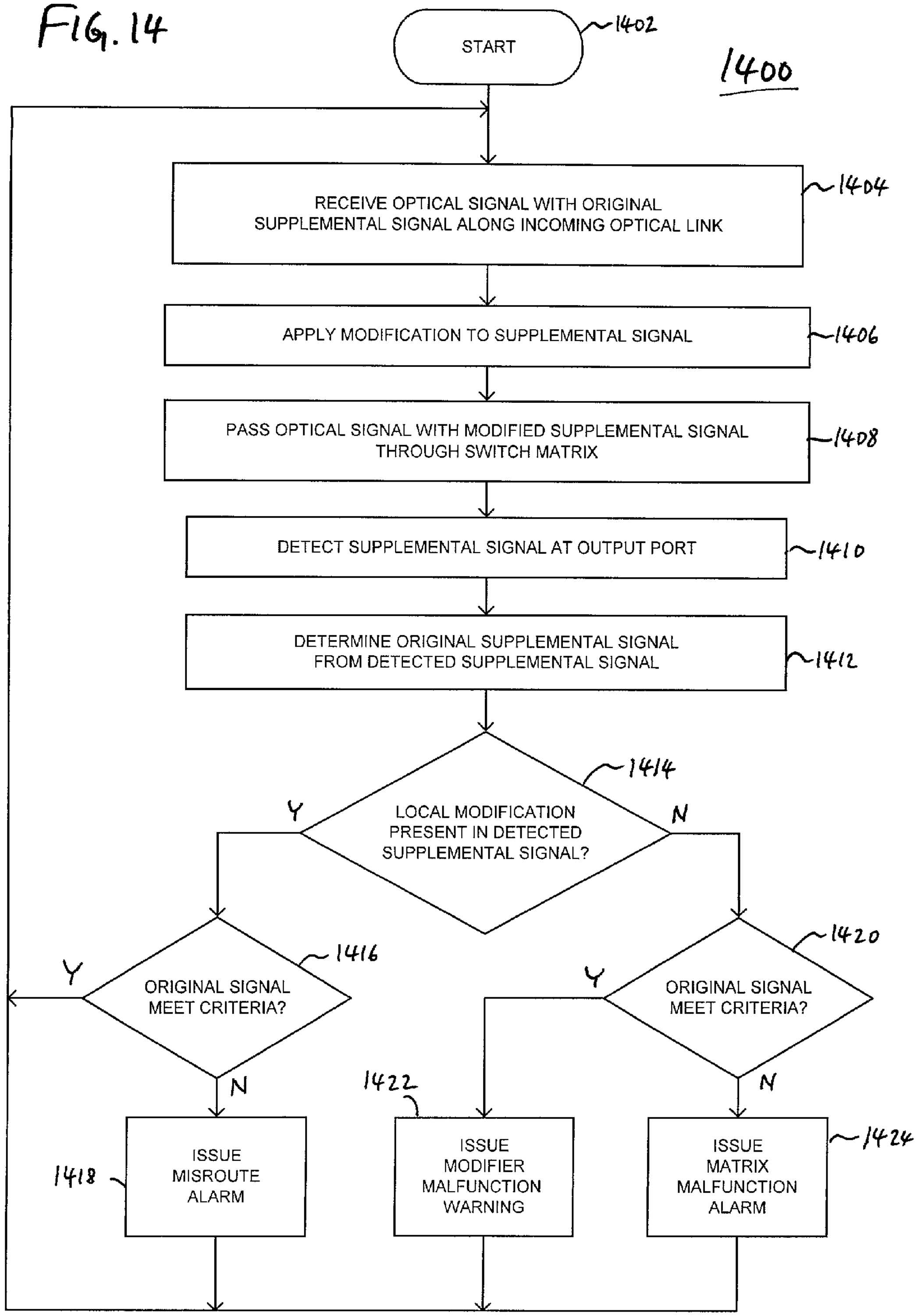
FIG. 14 is a flowchart describing a process whereby a supplemental signal may be analyzed both before and after passing through a switching matrix using only a single detector.

FIG. 14 of the drawings describes a process 1400 for analyzing supplemental signals which may be useful in the case where an supplemental signal undergoes modification yet some attributes of the original signal may be extracted or inferred from the modified supplemental signal. Process 1400 may be applicable, for example, to the arrangement of FIG. 7 when the modification performed by the supplemental signal modifiers is additive or cumulative in nature.

Process 1400 commences at step 1402 upon the need to evaluate proper routing of a given optical signal. Execution immediately proceeds to step 1404 wherein an optical signal is received at the cross-connect switch, the optical signal having an associated supplemental signal.

Next, in step 1406, the supplemental signal undergoes modification which may be of many varieties mentioned previously. For example, this modification may involve appending local data to a string of data already present in the received supplemental signal.

In step 1408, the received optical signal, along with the now modified supplemental signal, is passed through the switching matrix and presumably to a particular matrix output port to which a supplemental detector is coupled.

In step 1410, the supplemental signal is detected at the output port where the received optical signal port is supposed to be coupled assuming correct operation of the switch matrix. The supplemental signal, if any, is recovered and any attributes of the signal or information borne by the signal are rendered by the detector.

In step 1412, the supplemental signal is further processed to determine the attributes or information content that must have been present on the received supplemental signal prior to modification.

In step 1414, it is determined whether the modification applied locally in step 1406 indeed appears in the supplemental signal as detected in step 1410. Successful finding of the local modification indicates continuity through the switch and implies proper operation of the switch matrix.

If the local modification is present in the detected signal, then execution proceeds to step 1416, to check for correct routing of the received signal. The received supplemental signal information determined in step 1412 is compared to expected values for the inbound signal which may be obtained from external sources as described earlier. If the inferred original signal agrees with what is expected to be received at the switch, then no alarm condition need be declared and execution simply resumes step 1404 to continue monitoring using the remainder of process 1400.

Otherwise, if the original signal is incorrect despite proper continuity being indicated in step 1414, then a misrouting fault alarm is issued in step 1418 and the process loops to step 1404 to continue monitoring the supplemental signal.

Returning to step 1414, if the local modification is not evident in the detected supplemental signal, step 1420 is performed to determine if the lack of local continuity is corroborated by the remainder of the signal information or may be attributable to failure of the local modifier. In step 1420, the original signal inferred in step 1412 is compared to knowledge of what signal is expected to be received. Assuming that the supplemental signals along each of the many input ports are fairly unique, then detection of a correct original signal missing only the local modifications may indicate a failure the local modification process. Accordingly, if the determination in step 1420 is affirmative, then a "modifier malfunction warning" is issued in step 1422 and then execution loops to step 1404 to continue monitoring the supplemental signal.

If, in step 1420, it is determined that no aspects of the detected signal are correct, then a matrix malfunction alarm is declared in step 1424 and then execution loops to step 1404 to continue monitoring the supplemental signal.

While this invention has been described with reference to several illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An optical switch facilitating the verification of optical path integrity, comprising a plurality of optical signal ports and at least one optical switching element for causing an optical signal incident along a first optical signal port to be transmissively coupled to a second optical signal port, the optical switch further comprising:

a supplemental signal detector coupled to the second optical signal port for detecting a supplemental signal associated with the optical signal, wherein the supplemental signal includes a modulation applied to the optical signal, wherein the optical switch receives information about at least one attribute of the detected supplemental signal from the supplemental signal detector and issues a fault indication if the attribute does not meet an expected criterion, and wherein the criterion is determined based upon at least one previously detected value of the attribute.

2. The optical switch of claim 1 wherein the criterion is affected by information from a source outside of the optical switch.

3. The optical switch of claim 1 wherein the attribute is an amplitude level related to the supplemental signal.

4. The optical switch of claim 1 further comprising:

a supplemental signal injector coupled to the first optical signal port for adding a supplemental signal associated with the optical signal, wherein the supplemental signal includes a modulation applied to the optical signal.

5. The optical switch of claim 4 wherein the supplemental signal detector determines information about at least one attribute of the detected supplemental signal and the optical switch issues a fault indication based upon whether the attribute meets an expected criterion.

6. The optical switch of claim 4 wherein the optical switch determines the value of at least one attribute of the supplemental signal injected by the supplemental signal injector and receives information about the value of the attribute detected in the supplemental signal from the supplemental signal detector and issues a fault indication based upon whether the value of the attribute detected by the supplemental signal detector agrees with the value of the attribute imparted by the supplemental signal injector.

7. An optical switch facilitating the verification of optical path integrity, comprising a plurality of optical signal ports and at least one optical switching element for causing an optical signal incident along a first optical signal port to be transmissively coupled to a second optical signal port, the optical switch further comprising:

a first supplemental signal detector coupled to the first optical signal port for detecting a supplemental signal associated with the optical signal, wherein the supplemental signal includes a modulation applied to the optical signal; and a second supplemental signal detector coupled to the second signal port for detecting the supplemental signal associated with the optical signal, wherein the optical switch receives information about at least one attribute of the detected supplemental signals from both first and second supplemental signal detectors and issues a fault indication based at least upon whether the information about the attribute detected in the first supplemental signal agrees with the information about the attribute detected in the second supplemental signal.

8. The optical switch of claim 7 wherein the first supplemental signal detector determines information about at least one attribute of the detected supplemental signal and the optical switch further issues the fault indication if the attribute does not meet an expected criterion.

9. The optical switch of claim 8 wherein the expected criterion is affected by information from a source outside of the optical switch.

10. The optical switch of claim 7 wherein the optical switch receives information about at least one attribute of the detected supplemental signals from both first and second supplemental signal detectors and further issues the fault indication if either the attribute for the first supplemental signal does not meet a first expected criterion or, inclusively, the attribute for the second supplemental signal does not meet a second expected criterion.

11. The optical switch of claim 10 wherein the optical switch obtains information from a remote source affecting at least one of the first and second expected criteria.

12. An optical switch facilitating the verification of optical path integrity, comprising a plurality of optical signal ports and at least one optical switching element for causing an optical signal incident along a first optical signal port to be transmissively coupled to a second optical signal port, the optical switch further comprising:

a first supplemental signal detector coupled to the first optical signal port for detecting a supplemental signal associated with the optical signal, wherein the supplemental signal includes a modulation applied to the optical signal; and a second supplemental signal detector coupled to the second signal port for detecting the supplemental signal associated with the optical signal, wherein the first supplemental detector determines a first amplitude value of the supplemental signal and the second supplemental detector determines a second amplitude value of the supplemental signal and a loss value is calculated by subtracting the first amplitude value from the second amplitude value.

13. The optical switch of claim 12 wherein the optical switch issues a fault indication when the loss value exceeds a criterion.

14. The optical switch of claim 13 wherein the criterion is based upon previous values of the loss value.

15. The optical switch of claim 13 wherein the criterion is affected by information from a source outside of the optical switch.

16. An optical switch facilitating the verification of optical path integrity, comprising a plurality of optical signal ports and an optical switching matrix for causing an optical signal incident along a first optical signal port to be transmissively coupled to a second optical signal port, wherein the optical signal has an associated first supplemental signal originating outside of the optical switch, the optical switch further comprising:

a supplemental signal modifier coupled to the first optical signal port which may change the first supplemental signal into a second supplemental signal associated with the optical signal; and a supplemental signal detector coupled to the second signal port for detecting at least one supplemental signal associated with the optical signal, wherein the optical switch infers at least one attribute of the first supplemental signal by detection of the second supplemental signal and issues a fault indication depending at least upon whether the attribute meets an expected criterion for the first supplemental signal.

17. The optical switch of claim 16 wherein the criterion is affected by information from a source outside of the optical switch.

18. An optical switch facilitating the verification of optical path integrity, comprising a plurality of optical signal ports and an optical switching matrix for causing an optical signal incident along a first optical signal port to be transmissively coupled to a second optical signal port, wherein the optical signal has an associated first supplemental signal originating outside of the optical switch, the optical switch further comprising:

a supplemental signal modifier coupled to the first optical signal port which may change the first supplemental signal into a second supplemental signal associated with the optical signal; and a supplemental signal detector coupled to the second signal port for detecting at least one supplemental signal associated with the optical signal, wherein the optical switch infers at least one attribute of the first supplemental signal by detecting the second supplemental signal and issues a fault indication depending at least upon whether the first supplemental signal does not meet a first expected criterion or, inclusively, the second supplemental signal does not meet a second expected criterion.

19. The optical switch of claim 18 wherein at least one of the first and second criteria are affected by information from a source outside of the optical switch.

20. An optical switch facilitating the verification of optical path integrity, comprising a plurality of optical signal ports and an optical switching matrix for causing an optical signal incident along a first optical signal port to be transmissively coupled to a second optical signal port, wherein the optical signal has an associated first supplemental signal originating outside of the optical switch, the optical switch further comprising:

a supplemental signal modifier coupled to the first optical signal port which may change the first supplemental signal into a second supplemental signal associated with the optical signal; and a supplemental signal detector coupled to the second signal port for detecting at least one supplemental signal associated with the optical signal, wherein at least one attribute of the first supplemental signal is detected by the supplemental signal modifier and the attribute of the first supplemental signal is also inferred from the second supplemental signal received by the supplemental signal detector and the optical switch issues a fault indication depending at least upon whether the value of the attribute detected by the supplemental signal modifier differs from the value of the attribute detected by the supplemental signal detector.

21. In an optical network comprising at least one optical switch, a method for verifying optical path integrity comprising the steps of:

providing in the network at least one optical signal having at least one first supplemental signal associated therewith;

directing the network to route the optical signal to a first port of the optical switch;

as the optical signal approaches the first port, associating a second supplemental signal with the optical signal;

directing the optical switch to couple the first port to a second port of the optical switch;

at the second port, detecting the second supplemental signal;

indirectly determining at least one attribute of the first supplemental signal based upon the detected second supplemental signal; and determining whether the routing of the optical signal is correct based upon the indirectly determined attribute.

22. The method of claim 21 wherein the first supplemental signal does not reach the second port.

23. The method of claim 22 wherein the second supplemental signal replaces the first supplemental signal.

24. The method of claim 21 wherein the second supplemental signal bears a known relationship to the first supplemental signal.

25. The method of claim 24 wherein the second supplemental signal is created from the first supplemental signal by a known operation.

26. The method of claim 25 wherein the second supplemental signal is formed by modifying the first supplemental signal.

27. The method of claim 26 wherein the second supplemental signal is formed by addition to the first supplemental signal and the first supplemental signal is substantially intact within the second supplemental signal.

28. In an optical network comprising at least one optical switch, a method for determining optical path integrity, comprising the steps of:

providing, to a first port of the optical switch, at least one optical signal having associated therewith at least one supplemental signal having at least one attribute, wherein the one supplemental signal includes a modulation applied to the one optical signal;

establishing a first value for the attribute applicable to the optical signal upon entry to the first port, wherein the first value is established by detecting the supplemental signal and determining the first value by measurement;

directing the optical switch to couple the first port to a second port of the optical switch;

at the second port, detecting the supplemental signal and determining a second value for the attribute;

at a first instant in time, computing a first difference value between the first value and second value; and determining optical path integrity based upon the first difference value.

29. The method of claim 28 wherein the attribute is related to amplitude.

30. The method of claim 28 wherein the attribute is related to wavelength.

31. The method of claim 28 wherein the attribute is related to frequency of the supplemental signal.

32. The method of claim 28 further comprising:

at a second instant in time distinct from the first instant in time, determining a second difference value in the same manner as the determining of the first difference value; and determining optical path integrity based at least upon comparison among the first and second difference values.

33. An optical switch facilitating the verification of optical path integrity, comprising a plurality of optical signal ports and at least one optical switching means for causing an optical signal incident along a first optical signal port to be transmissively coupled to a second optical signal port, the optical switch further comprising:

at least one supplemental signal detecting means coupled to the second optical signal port for detecting at least one supplemental signal associated with the optical signal and determining a value of at least one attribute of the supplemental signal, wherein the one supplemental signal includes a modulation applied to the optical signal;

attribute evaluating means for determining whether the value of the attribute meets at least one criterion; and fault indicating means for issuing a fault indication based upon whether the value of the attribute meets the criterion, wherein the criterion is determined based upon at least one previously detected value of the attribute.

34. The optical switch of claim 33 further comprising communicating means for communicating with a source outside the optical switch to affect the criterion.

35. The optical switch of claim 33 wherein the attribute is an amplitude level related to the supplemental signal.

36. An optical switch facilitating the verification of optical path integrity, comprising a plurality of optical signal ports and at least one optical switching means for causing an optical signal incident along a first optical signal port to be transmissively coupled to a second optical signal port, the optical switch further comprising:

a first supplemental signal detecting means coupled to the first optical signal port for detecting a supplemental signal associated with the optical signal, wherein the supplemental signal includes a modulation applied to the optical signal;

a second supplemental signal detecting means coupled to the second signal port for detecting the supplemental signal associated with the optical signal;

comparing means for comparing a first sampling of the supplemental signal as detected by the first supplemental signal detecting means to a second sampling of the supplemental signal as detected by the second supplemental signal detecting means; and fault indicating means coupled to the comparing means for issuing a fault indication based at least upon whether the first sampling is substantially consistent with the second sampling.

37. The optical switch of claim 36 further comprising:

means for determining the value of at least one attribute of the detected supplemental signal from the first supplemental signal detecting means, wherein the fault indicating means is further enabled to issue the fault indication based at least upon whether the value of the attribute does not meet at least one criterion.

38. The optical switch of claim 37 further comprising communicating means for communicating with a source outside the optical switch to affect the criterion.

39. An optical switch facilitating the verification of optical path integrity, comprising a plurality of optical signal ports and at least one optical switching means for causing an optical signal incident along a first optical signal port to be transmissively coupled to a second optical signal port, the optical switch further comprising:

a first supplemental signal detecting means coupled to the first optical signal port for detecting a supplemental signal associated with the optical signal, wherein the supplemental signal includes a modulation applied to the optical signal;

a second supplemental signal detecting means coupled to the second signal port for detecting the supplemental signal associated with the optical signal;

comparing means for comparing a first value of at least one attribute of the supplemental signal as detected by the first supplemental signal detecting means to a second value of the attribute of the supplemental signal as detected by the second supplemental signal detecting means; and fault indicating means coupled to the comparing means for issuing a fault indication based at least upon whether the first value is substantially consistent with the second value.

40. An optical switch facilitating the verification of optical path integrity, comprising a plurality of optical signal ports and at least one optical switching means for causing an optical signal incident along a first optical signal port to be transmissively coupled to a second optical signal port, the optical switch further comprising:

a first supplemental signal detecting means coupled to the first optical signal port for detecting a supplemental signal associated with the optical signal, wherein the supplemental signal includes a modulation applied to the optical signal;

a second supplemental signal detecting means coupled to the second signal port for detecting the supplemental signal associated with the optical signal, wherein the first supplemental detecting means determines a first amplitude value of the supplemental signal and the second supplemental detecting means determines a second amplitude value of the supplemental signal; and a loss determining means which determines a loss value by calculating a difference between the first amplitude value and the second amplitude value.

41. The optical switch of claim 40 further comprising: fault indicating means coupled to the loss determining means for issuing a fault indication based at least upon whether the loss value meets a criterion.

42. The optical switch of claim 41 wherein the criterion is based upon previous values of the loss value.

43. The optical switch of claim 41 further comprising communicating means for communicating with a source outside the optical switch to affect the criterion.

44. An optical switch facilitating the verification of optical path integrity, comprising a plurality of optical signal ports and at least one optical switching means for causing an optical signal incident along a first optical signal port to be transmissively coupled to a second optical signal port, the optical switch further comprising:

a supplemental signal injecting means coupled to an optical line associated with the first optical signal port for adding a supplemental signal associated with the optical signal, wherein the supplemental signal includes a modulation applied to the optical signal;

a supplemental signal detecting means coupled to a second optical line associated with the second signal port for detecting the supplemental signal associated with the optical signal;

comparing means for comparing the supplemental signal as injected by the supplemental signal injecting means to the supplemental signal as detected by the supplemental signal detecting means;

fault indicating means coupled to the comparing means for issuing a fault indication based at least upon whether the detected supplemental signal is substantially consistent with the injected supplemental signal; and means for determining the value of at least one attribute of the detected supplemental signal from the supplemental signal detecting means, wherein the fault indicating means is further enabled to issue the fault indication based at least upon whether the value of the attribute does not meet at least one criterion.

45. An optical switch facilitating the verification of optical path integrity, comprising a plurality of optical signal ports and at least one optical switching means for causing an optical signal incident along a first optical signal port to be transmissively coupled to a second optical signal port, the optical switch further comprising:

a supplemental signal injecting means coupled to an optical line associated with the first optical signal port for adding a supplemental signal associated with the optical signal, wherein the supplemental signal includes a modulation applied to the optical signal;

a supplemental signal detecting means coupled to a second optical line associated with the second signal port for detecting the supplemental signal associated with the optical signal;

comparing means for comparing the supplemental signal as injected by the supplemental signal injecting means to the supplemental signal as detected by the supplemental signal detecting means; and fault indicating means coupled to the comparing means for issuing a fault indication based at least upon whether the detected supplemental signal is substantially consistent with the injected supplemental signal, wherein the comparing means is further enabled to compare a first value of at least one attribute of the supplemental signal as injected by the supplemental signal injecting means to a second value of the attribute supplemental signal as detected by the supplemental signal detecting means, and wherein the fault indicating means is further enabled to issue the fault indication based at least upon whether the first value is substantially consistent with the second value.

46. An optical switch facilitating the verification of optical path integrity, comprising a plurality of optical signal ports and at least one optical switching means for causing an optical signal incident along a first optical signal port to be transmissively coupled to a second optical signal port, wherein the optical signal has an associated first supplemental signal originating outside of the optical switch, the optical switch further comprising:

supplemental signal modifying means, coupled to a first optical line associated with the first optical signal port, for changing the first supplemental signal into a second supplemental signal associated with the optical signal; and a supplemental signal detecting means coupled to the second signal port for detecting at least one supplemental signal associated with the optical signal, wherein the optical switch infers at least one attribute of the first supplemental signal by detection of the second supplemental signal and issues a fault indication if the attribute does not meet an expected criterion for the first supplemental signal.

47. The optical switch of claim 46 further comprising communicating means for communicating with a source outside the optical switch to affect the criterion.

48. An optical switch facilitating the verification of optical path integrity, comprising a plurality of optical signal ports and at least one optical switching means for causing an optical signal incident along a first optical signal port to be transmissively coupled to a second optical signal port, wherein the optical signal has an associated first supplemental signal originating outside of the optical switch, the optical switch further comprising:

supplemental signal modifying means, coupled to a first optical line associated with the first optical signal port, for changing the first supplemental signal into a second supplemental signal associated with the optical signal; and a supplemental signal detecting means coupled to the second signal port for detecting at least one supplemental signal associated with the optical signal, wherein the optical switch infers at least one attribute of the first supplemental signal by detecting the second supplemental signal and issues a fault indication if either the first supplemental signal does not meet a first expected criterion or, inclusively, the second supplemental signal does not meet a second expected criterion.

49. The optical switch of claim 48 further comprising communicating means for communicating with a source outside the optical switch to affect at least one of the first and second criteria.

50. An optical switch facilitating the verification of optical path integrity, comprising a plurality of optical signal ports and at least one optical switching means for causing an optical signal incident along a first optical signal port to be transmissively coupled to a second optical signal port, wherein the optical signal has an associated first supplemental signal originating outside of the optical switch, the optical switch further comprising:

supplemental signal modifying means, coupled to a first optical line associated with the first optical signal port, for changing the first supplemental signal into a second supplemental signal associated with the optical signal; and a supplemental signal detecting means coupled to the second signal port for detecting at least one supplemental signal associated with the optical signal, wherein a first value for at least one attribute of the first supplemental signal is detected by the supplemental signal modifying means and a second value for the attribute of the first supplemental signal is also inferred from the second supplemental signal received by the supplemental signal detector and the optical switch issues a fault indication based upon whether the first value agrees with the second value.

* * * * *